US011899799B2

(12) United States Patent
Doenhoff et al.

(10) Patent No.: US 11,899,799 B2
(45) Date of Patent: Feb. 13, 2024

(54) SECURITY RISK REDUCTION METHOD AND SECURITY RISK REDUCTION SYSTEM

(71) Applicant: Hitachi, Ltd., Tokyo (JP)

(72) Inventors: Jens Doenhoff, Tokyo (JP); Nodoka Mimura, Tokyo (JP); Yoshiaki Isobe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 444 days.

(21) Appl. No.: 17/029,840

(22) Filed: Sep. 23, 2020

(65) Prior Publication Data

US 2021/0173938 A1    Jun. 10, 2021

(30) Foreign Application Priority Data

Dec. 6, 2019  (JP) ................................ 2019-220891

(51) Int. Cl.
*G06F 21/57* (2013.01)
*G06F 8/65* (2018.01)

(52) U.S. Cl.
CPC .............. *G06F 21/577* (2013.01); *G06F 8/65* (2013.01); *G06F 21/572* (2013.01); *G06F 2221/033* (2013.01)

(58) Field of Classification Search
CPC .................................................. G06F 21/577
See application file for complete search history.

(56) References Cited

U.S. PATENT DOCUMENTS

| 10,027,711 | B2* | 7/2018 | Gill ..................... H04L 63/1441 |
| 2010/0064289 | A1* | 3/2010 | Oe ......................... G06F 9/468 718/102 |
| 2017/0041347 | A1 | 2/2017 | Nagaratnam et al. |
| 2020/0226298 | A1* | 7/2020 | Applebaum .......... G06F 21/606 |

FOREIGN PATENT DOCUMENTS

WO       2019/142267 A1      7/2019

OTHER PUBLICATIONS

Shinya Kitajima, Naoki Matsuoka, "A Method to Infer Calling Relationship Based on Communication Logs for Microservice Architecture", DBSJ Japanese Journal, vol. 16-J, [online], Japan, Mar. 31, 2018, pp. 1-8.
Japanese Patent Office, Notice of Reasons for Refusal, Application No. 2019-220891, dated Feb. 14, 2023, in 8 pages.

* cited by examiner

*Primary Examiner* — Simon P Kanaan
(74) *Attorney, Agent, or Firm* — Procopio, Cory, Hargreaves & Savitch LLP

(57) ABSTRACT

A system performs an application update process based on security management information that is information including meta information for each of a plurality of security services. The application update process is a process for adding one or more security services including a security service that reduces the security risk of an application having a plurality of distributed microservices having a graph structure relationship to the application.

18 Claims, 21 Drawing Sheets

FIG. 3

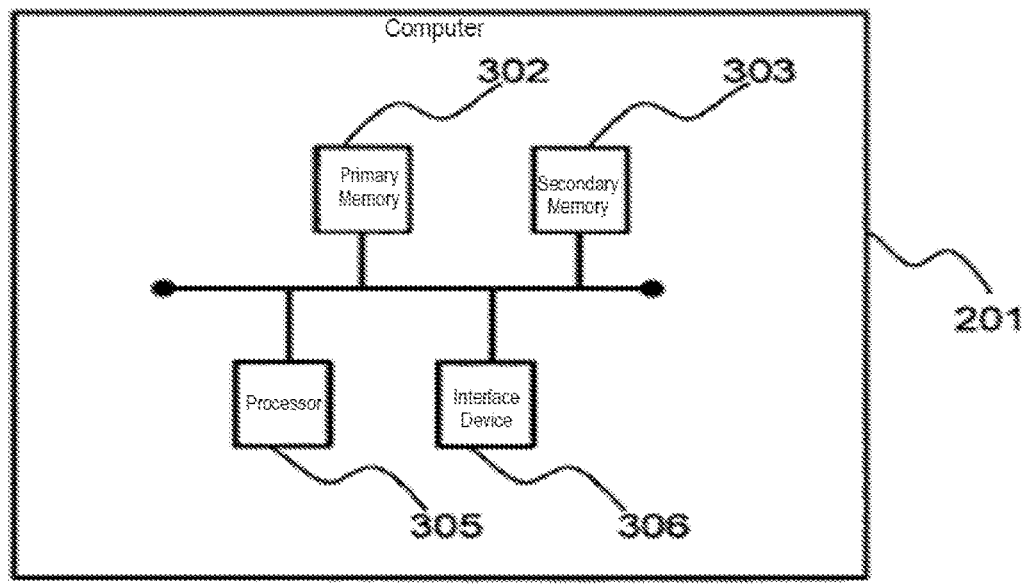

FIG. 4

SECURITY MANAGEMENT DB
113

| TYPE | VERSION | TARGET PROTOCOL | VALID SETTING | DEPLOYMENT SETTING |
|---|---|---|---|---|
| IDS | abc-1.16.5 | · TCP<br>· UDP | SETTING FILE [A.conf]<br>SETTING FILE [B.conf]<br>SETTING PARAMETER [C]<br>SETTING PARAMETER [D] | SERVICE CONTAINER [E]<br>INSTALLATION METHOD [F]<br>INSTALLATION PARAMETER [G] |
| WAF | def-11.5i | · HTTP | SETTING FILE [H.xml] | SERVICE CONTAINER [I]<br>INSTALLATION METHOD [J]<br>INSTALLATION PARAMETER [K] |
| Log-collection | ghi-8.0 | (NONE) | SETTING FILE [L.conf]<br>SETTING PARAMETER [M] | SERVICE CONTAINER [N]<br>INSTALLATION METHOD [O]<br>INSTALLATION PARAMETER [P] |

ANALYSIS RESULT TABLE
700

| | | | |
|---|---|---|---|
| 711 | APPLICATION FLOW ID | | 738f4824 |
| 712 | NUMBER OF SECURITY SERVICES | | 2 |
| | SECURITY SERVICE #1 | | |
| 713A | 71 — SECURITY SERVICE TYPE | | IDS |
| | 72 — SECURITY SERVICE VERSION | | abc-1.16.5 |
| | 73 — CORRESPONDING SERVICE ID | | 18a12497 |
| | 74 — NUMBER OF SETTING PARAMETERS | | 2 |
| | SETTING PARAMETER #1 | | |
| | 75A | 81 — PARAMETER NAME | Param1 |
| | | 82 — PARAMETER VALUE | 100 |
| | SETTING PARAMETER #2 | | |
| | 75B | PARAMETER NAME | ALERTTARGET |
| | | PARAMETER VALUE | soc01.example.com |
| | 76 — NUMBER OF SETTING FILES | | 2 |
| | SETTING FILE #1 | | |
| | 77A | 84 — PATH NAME | A.conf |
| | | 85 — FILE CONTENT | YWxlcnRUYXJnZXQge3tBTEVSVFRBU kdFVH19CnVzZVJ1bGVzIC92YXIvbGliL 2lkcy9ydWxlcy9ydWxlLmNvbmYK |
| | SETTING FILE #2 | | |
| | 77B | PATH NAME | B.conf |
| | | FILE CONTENT | YWxlcnQgdGNwIGFueSA2NjY3IC0+IGF ueSBhbnkgKG1zZzoiQyZDIFNlcnZlciBz ZW50IG5ldGluZm8gY29tbWFuZCI7Y29 udGVudDoiIW5ldGluZm8iO3NpZDoxMD AwMDA2OykK |
| | SECURITY SERVICE #2 | | |
| 713B | SECURITY SERVICE TYPE | | WAF |
| | SECURITY SERVICE VERSION | | def-11.5i |
| | CORRESPONDING SERVICE ID | | fb4f6ea9 |
| | NUMBER OF SETTING PARAMETERS | | 1 |
| | SETTING PARAMETER #1 | | |
| | | PARAMETER NAME | BACKEND |
| | | PARAMETER VALUE | http://127.0.0.1:9200 |
| | NUMBER OF SETTING FILES | | 0 |

FIG. 11

SERVICE SETTING DB ENTRY
1100X

| 1101 | | |
|---|---|---|
| 1102 SERVICE ID | | AAA |
| NUMBER OF SERVICE SETTINGS | | 2 |
| 1103A SERVICE SETTING #1 | | |
| | 41 SETTING TYPE | Service |
| | 42 EXTERNAL PORT | 9200 |
| | 43 INTERNAL PORT | 9200 |
| 1103B SERVICE SETTING #2 | | |
| | 44 SETTING TYPE | Deployment |
| | 45 NUMBER OF TIMES OF DEPLOYMENT | 1 |
| | 46 SHARED VOLUME | NONE |
| | 47 NUMBER OF CONTAINERS | 1 |
| | CONTAINER #1 | |
| 48A | 49 CONTAINER NAME | DATA RECEPTION |
| | 50 CONTAINER IMAGE NAME | receiver-1.0 |
| | 51 PUBLICATION PORT | 9200 |

FIG. 15

SERVICE SETTING DB ENTRY
1100Y

| 1101 | | | |
|---|---|---|---|
| 1102 | SERVICE ID | | AAA |
| | NUMBER OF SERVICE SETTINGS | | 2 |
| | SERVICE SETTING #1 | | |
| 1103A | 41 — SETTING TYPE | | Service |
| | 42 — EXTERNAL PORT | | 9200 |
| | 43 — INTERNAL PORT | | 8001 |
| | SERVICE SETTING #2 | | |
| 1103B | 44 — SETTING TYPE | | Deployment |
| | 45 — NUMBER OF TIMES OF DEPLOYMENT | | 1 |
| | 46 — SHARED VOLUME | | |
| | | 52 — VOLUME NAME | WAF-logs |
| | 47 — NUMBER OF CONTAINERS | | 3 |
| | CONTAINER #1 | | |
| 48A | 49 — CONTAINER NAME | | DATA RECEPTION |
| | 50 — CONTAINER IMAGE NAME | | receiver-1.0 |
| | 51 — PUBLICATION PORT | | 9200 |
| | CONTAINER #2 | | |
| 48B | 53 — CONTAINER NAME | | WAF |
| | 54 — CONTAINER IMAGE NAME | | def-11.5i |
| | 55 — PUBLICATION PORT | | 8001 |
| | SHARED VOLUME MOUNT | | |
| | 56 | 58 — VOLUME NAME | WAF-logs |
| | | 59 — MOUNT PATH | /var/log/waf |
| | ENVIRONMENT VARIABLE | | |
| | 57 | 61 — VARIABLE NAME | BACKEND |
| | | 62 — VARIABLE VALUE | http://127.0.0.1:9200 |
| | CONTAINER #3 | | |
| 48C | 63 — CONTAINER NAME | | Log-collector |
| | 64 — CONTAINER IMAGE NAME | | ghi-8.0 |
| | SHARED VOLUME MOUNT | | |
| | 66 | 68 — VOLUME NAME | WAF-logs |
| | | 69 — MOUNT PATH | /var/log/waf |
| | ENVIRONMENT VARIABLE | | |
| | 67 | 91 — VARIABLE NAME | ALERTTARGET |
| | | 92 — VARIABLE VALUE | soc01.example.com |

US 11,899,799 B2

SECURITY RISK REDUCTION METHOD AND SECURITY RISK REDUCTION SYSTEM

INCORPORATION BY REFERENCE

This application claims priority based on Japanese patent application, No. 2019-220891 filed on Dec. 6, 2019, the entire contents of which are incorporated herein by reference.

BACKGROUND

The present invention relates generally to computing technologies that reduce security risks.

In an application as a system in which a plurality of modularized services are distributed, as represented by a service-oriented architecture, data utilization such as collection, analysis, conversion, and storage is realized in a scalable manner. Such an application can be realized on a computer system including a plurality of physical computers, for example, a cloud platform. The cloud platform may be a platform as a cloud computing service (for example, a platform), and specifically, may be a public cloud, a private cloud, or a combination thereof. Hereinafter, an individually modularized service in the application will be referred to as "microservice". In addition, an application deployed on the cloud platform is called "cloud-based application."

An application having a plurality of distributed microservices is more likely to have a security risk (vulnerability) than an application having a single microservice. One reason is that data communication between the distributed microservices is usually done via a network. For example, communication among the microservices may occur over a plurality of networks, including networks under the control of third parties, and applications containing such microservices may have a high security risk.

US 2017/0041347 discloses a technique of an application being deployed to a specific cloud security environment.

SUMMARY

According to US 2017/0041347, a security risk that is reduced among the security risks that can exist in the application depends on the security function of the cloud security environment of the deployment destination. In other words, it is impossible to use the security functions that are not provided in the cloud security environment.

The system performs an application update process based on security management information that is information including meta information for each of the plurality of security services. The application update process is a process for adding one or more security services including a security service that reduces the security risk of an application having a plurality of distributed microservices having a graph structure relationship to the application.

The security risk of the application can thus be reduced without specific security function requirements of the environment in which the application is realized.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a diagram illustrating the physical configuration of a computer;

FIG. 4 is a diagram illustrating the configuration of a security management DB;

FIG. 7 is a diagram illustrating an example of an analysis result table;

FIG. 11 is a diagram Illustrating an example of a service setting DB entry of a microservice in an application;

FIG. 15 is a diagram illustrating an example of a service setting DB entry of a microservice in an updated application;

DESCRIPTION OF THE EMBODIMENTS

Figure 1:
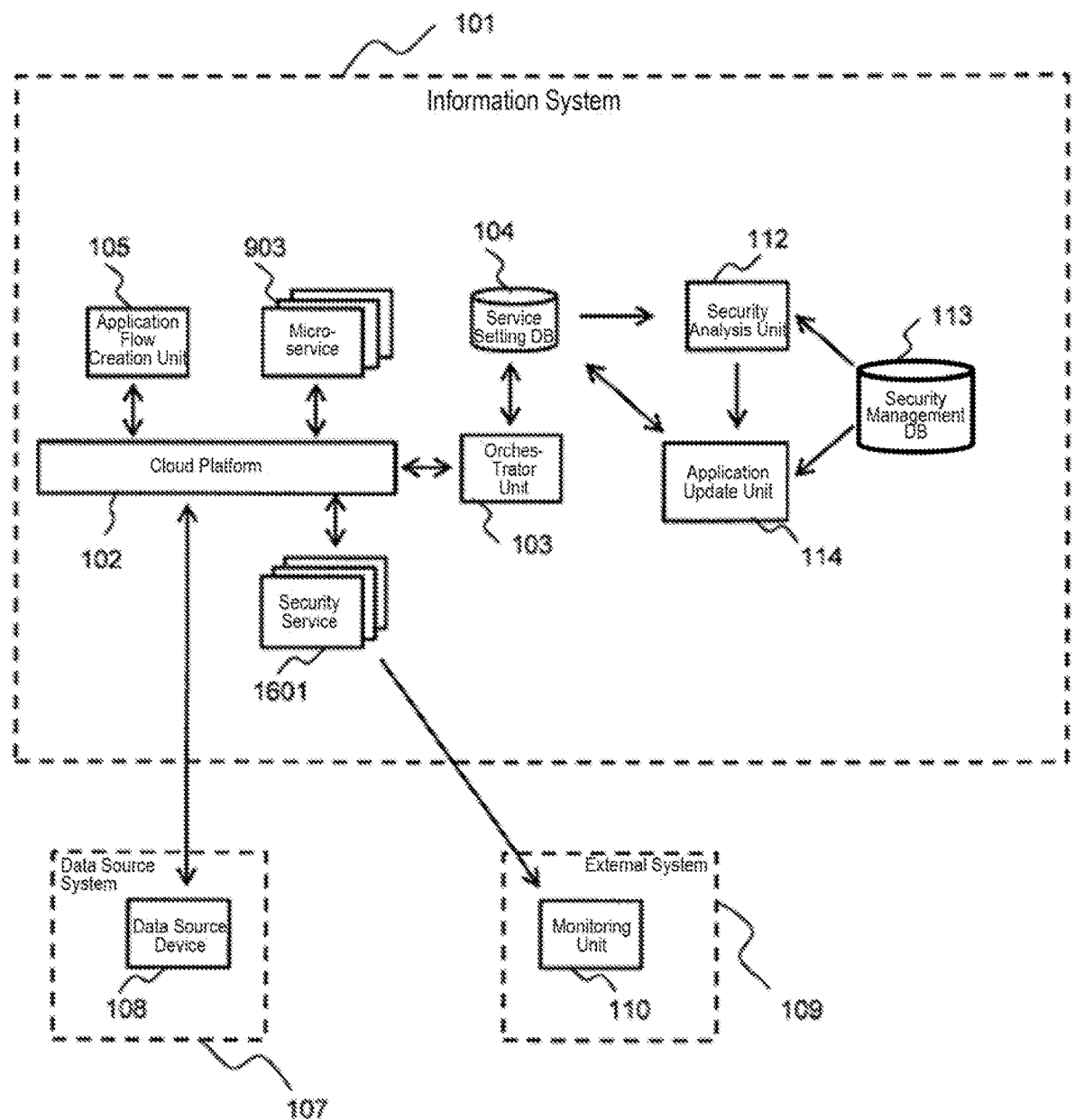
FIG. 1 is a diagram illustrating an outline of the configuration of the entire system according to a first embodiment.

In the following description, a "communication interface device" may represent one or more communication interface devices. The one or more interface devices may be one or more communication interface devices of the same type (for example, one or more NICs (Network Interface Card)), or may be two or more communication interface devices of different types (for example, NIC and HBA (Host Bus Adapter)).

Further, in the following description, a "memory" is one or more memory devices that are examples of one or more storage devices, and may typically be a main memory device. At least one memory device in the memory may be a volatile memory device or a non-volatile memory device.

Further, in the following description, a "persistent storage device" may be one or more persistent storage devices that are examples of one or more storage devices. The persistent storage device may typically be a non-volatile storage device (for example, auxiliary storage device), and specifically, for example, an HDD (Hard Disk Drive), an SSD (Solid State Drive), an NVMe (Non-Volatile Memory Express) drive or an SCM (Storage Class Memory) may be used.

Further, in the following description, a "storage device" may be a memory or at least the memory of the persistent storage device.

Further, in the following description, a "processor" may be one or more processor devices. At least one processor device is typically a microprocessor device such as a CPU (Central Processing Unit), or may be other types of processor devices such as a GPU (Graphics Processing Unit). At least one processor device may be configured by a single core, or multiple cores. At least one processor device may be a processor core. At least one processor device may be a processor device such as a hardware circuit (for example, FPGA (Field-Programmable Gate Array), CPLD (Complex Programmable Logic Device), or an ASIC (Application Specific Integrated Circuit)) which performs some or all of the processes in a broad sense.

In addition, in the following description, the information that can be output for an input may be described in terms of expressions such as "xxx table", "xxx entry", or "xxx DB". The information may be any structured data (for example, structured data or unstructured data), or may be a learning model represented by a neural network that generates an output to an input, a genetic algorithm, or a random forest. Therefore, the "xxx table", "xxx entry" or "xxx DB" can be called "xxx information". In addition, in the following description, the configuration of each table is given as merely exemplary. One table may be divided into two or more tables, or all or some of two or more tables may be configured by one table. The "DB" is an abbreviation for database.

In the following description, a function may be described by the expression "yyy part" or "zzz service". The function may be realized by one or more computer programs being executed by a processor or may be realized by one or more hardware circuits (for example, FPGA or ASIC) or a combination thereof. When the function is realized by the program being executed by the processor, a predetermined process is performed while appropriately using a storage device and/or an interface device, and thus the function may be at least part of the processor. The process described with the function as the subject may be a process performed by a processor or a device having the processor. The program may be installed from a program source. The program source may be, for example, a program distribution computer or a computer-readable recording medium (for example, a non-transitory recording medium). The description of each function is an example, and a plurality of functions may be combined into one function, or one function may be divided into a plurality of functions.

Further, in the following description, in a case where the same type of elements is referred without distinction, a common symbol of the reference symbols may be used. In a case where the same type of elements is referred in distinction, the reference numeral may be used. For example, when communication modules are not distinguished, it is referred to as "computer 201", and when the computers are distinguished, it is referred to as "computer 201A" or "computer 201B".

Figure 21:
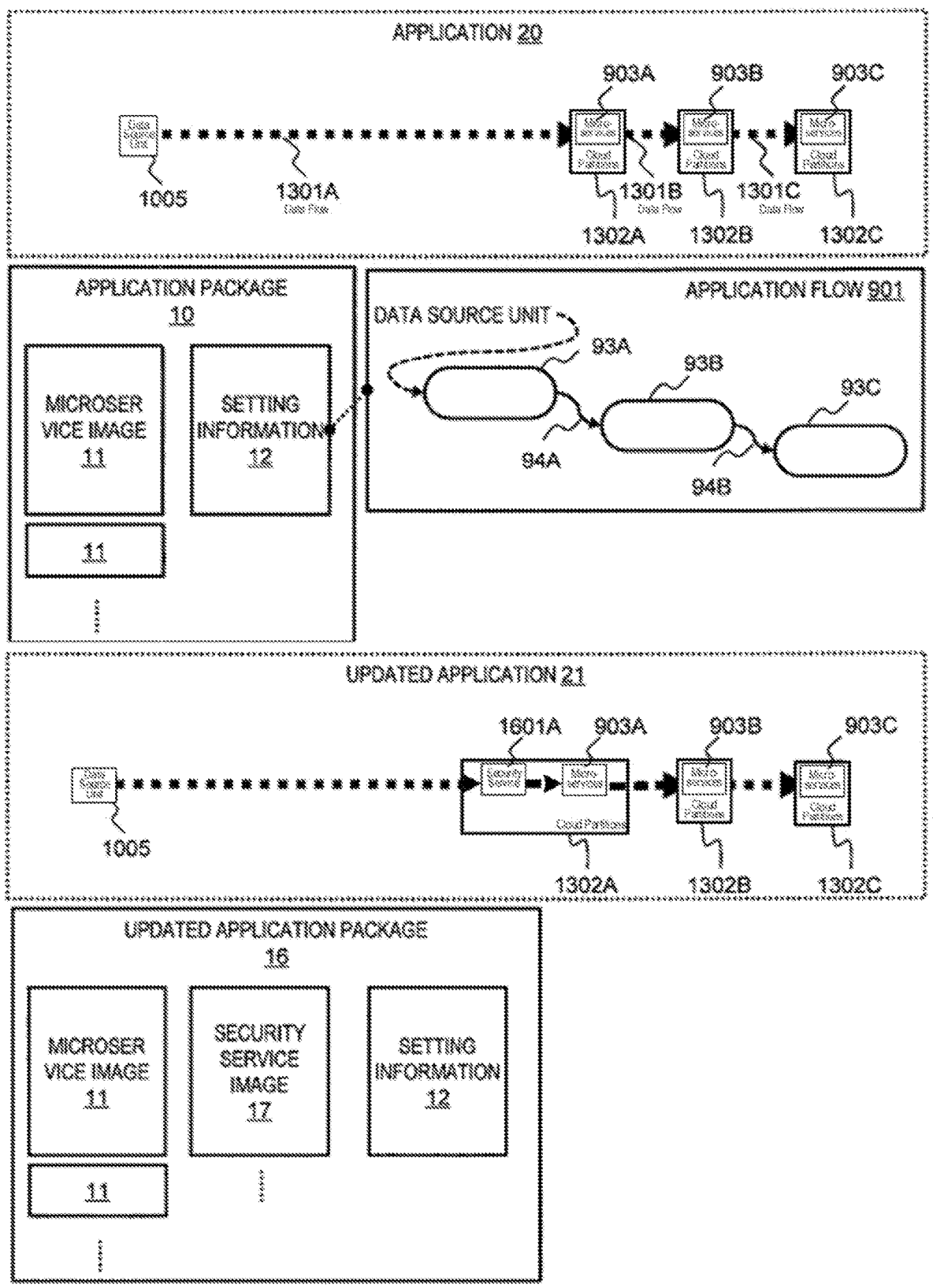
FIG. 21 is a diagram Illustrating definitions of examples of terms used in the first to third embodiments.

In the following description of embodiments, the definitions of terms are as follows (see FIG. 21).

An application 20 is one service including a plurality of microservices 903. The application 20 is a cloud-based application realized on a cloud platform. In the example of FIG. 21, in the application 20, a microservice 903A receives data from a data source unit 1005, a microservice 903B receives data from the microservice 903A, and a microservice 903C receives data from the microservice 903B. The data source unit 1005 may or may not be included in the application 20.

The microservice 903 corresponds to a component of the application 20. The microservice 903 is arranged in a cloud partition 1302 and is executed by a container built on the cloud partition 1302.

The container is an example of the execution environment of the microservice 903. A virtual machine (VM) may be adopted instead of the container.

The cloud partition 1302 is an example of a calculation resource range, and is specifically a calculation resource range of the cloud platform. One or more microservices 903 operating in the cloud partition 1302 use the same resource range as the cloud partition 1302. The cloud partition 1302 may be omitted.

A data flow 1301 is a flow of data to the microservice 903 or a flow of data from the microservice 903. According to the example of FIG. 21, there are a data flow 1301A from the data source unit 1005 to the microservice 903A, a data flow 1301B from the microservice 903A to the microservice 903B, and a data flow 1301C from the microservice 903B to the microservice 903C.

An application package 10 is the definition information of the application 20. Specifically, the application package 10 includes a plurality of microservice images 11 and setting information 12.

The microservice image 11 is an image of the microservice 903, specifically, an image of the microservice 903 and a container that is an example of an execution environment of the microservice 903.

The setting information 12 is information including a meta information entity for each of the plurality of microservices 903 (the plurality of service images 11). The setting information 12 may include information indicating an application flow 901.

The application flow 901 represents the plurality of microservices 903 in the application 20 and data input/output of each microservice 903. The application flow 901 is an effective graph including a plurality of nodes 93 respectively corresponding to the plurality of microservices 903. The node 93 represents the microservice 903, and an edge 94 represents the data flow 1301. That is, in the application 20, a node is the microservice 903. In the application package 10, a node is the microservice image 11.

An updated application 21 is an updated version of the application 20, specifically an application to which one or more security services 1601 have been added.

The security service 1601 executes a security-related process (for example, data check or log output). The security service 1601 is arranged in the cloud partition 1302 and executed in a container built on the cloud partition 1302.

An updated application package 16 is an updated version (repackaged version) of the application package 10, specifically an application package to which one or more security service images 17 are added.

The security service image 17 is an image of the security service 1601, specifically an image of the security service 1601 and a container that is an example of an execution environment of the security service 1601.

The microservice 903 and the security service 1601 are examples of modularized services.

[First Embodiment]

FIG. 1 illustrates an outline of the configuration of the entire system according to the first embodiment.

There is an information system 101. The information system 101 may be a data center or cloud. The information system 101 communicates with a data source device 108 (for example, a sensor, or a system including multiple sensors and concentrators) in a data source system 107 (for example, a factory). For example, the information system 101 receives data from the data source device 108.

The information system 101 may send data to a monitoring unit 110 in an external system 109. The external system 109 may be a computer system such as a center that performs security operations. The monitoring unit 110 monitors event data representing a security-related event.

The information system 101 provides an application (cloud-based application) based on a cloud platform 102. The microservice 903 and the security service 1601 are executed on the cloud platform 102.

The information system 101 includes an application flow creation unit 105, an orchestrator unit 103, a security analysis unit 112, an application update unit 114, a service setting DB 104, and a security management DB 113. At least the application flow creation unit 105 may be an external function of the information system 101. Further, the orchestrator unit 103 may be a part of the cloud platform 102.

The application flow creation unit 105 creates an application flow. The application flow creation unit 105 is, for example, a visual programming tool.

The orchestrator unit 103 deploys the updated application package (the plurality of microservice images 11 and one or more security service images 17) on the cloud platform 102 based on the service setting DB 104.

The security analysis unit 112 estimates the security risk of an application (an application having a plurality of distributed microservices having a graph structure relationship) by analyzing the application package based on the service setting DB 104. The security analysis unit 112 determines one or more security services including a security service that reduces the estimated security risk based on the security management DB 113. The security analysis unit 112 acquires a meta information detail of each of the one or more security services based on the security management DB 113, and outputs an analysis result table including the meta information detail acquired for each of the one or more security services.

The application update unit 114 reduces the security risk of the application. Specifically, the application update unit 114 performs an application update process that is a process for adding one or more security services described above to an application based on the security management DB 113 and the analysis result table.

The service setting DB 104 includes a meta information entity for each of the plurality of microservices 903. The orchestrator unit 103 deploys the image 11 or 17 and controls the service 903 or 1601 based on the service setting DB 104. The application update unit 114 may also serve as the orchestrator unit 103.

The security management DB 113 includes meta information for each of the plurality of security services 1601.

The service setting DB 104 and the security management DB 113 may be stored in a storage area (for example, a logical volume) provided by the cloud platform 102 or a storage device that can communicate with the cloud platform 102.

Figure 2:
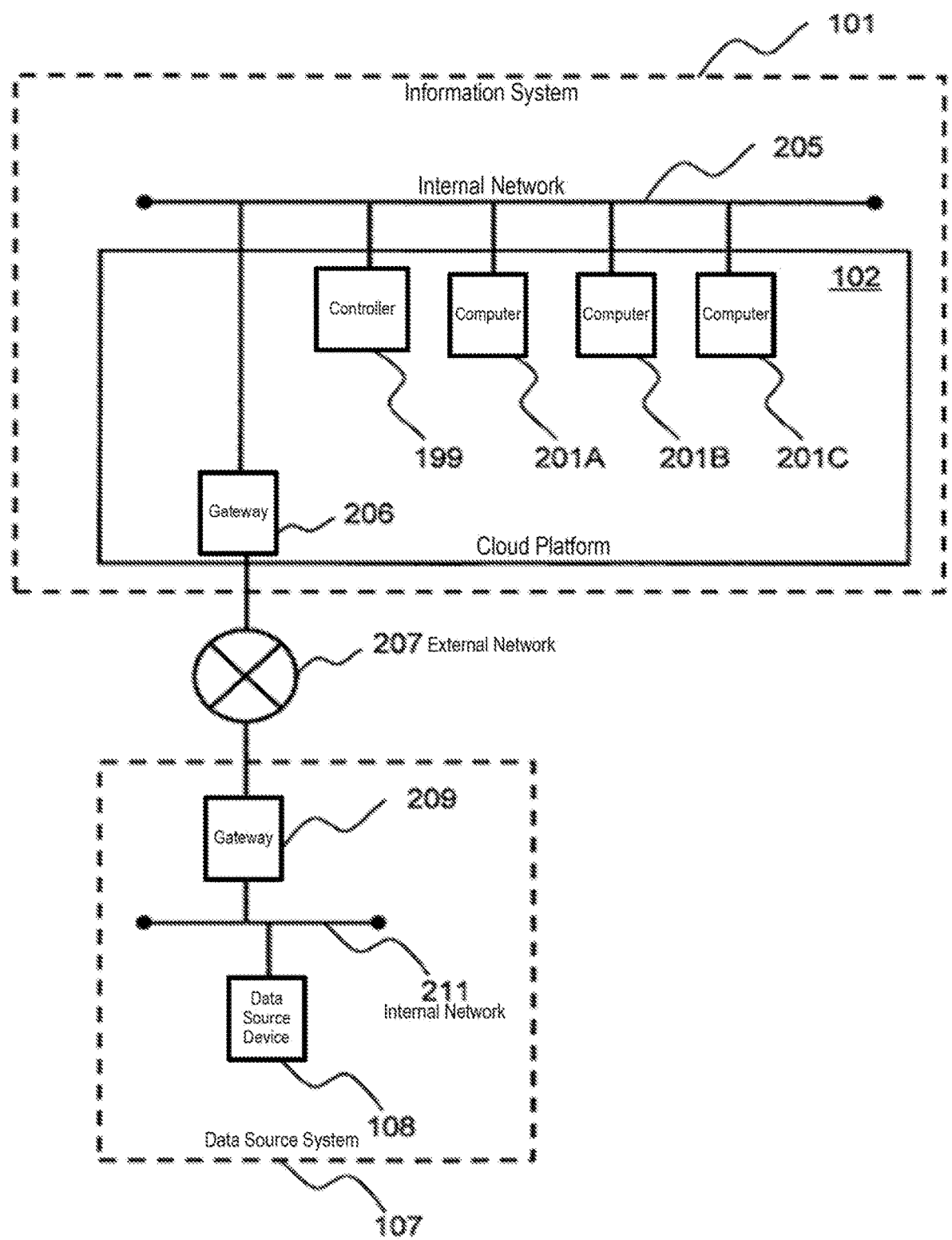
FIG. 2 is a diagram illustrating the physical configuration of the entire system.

FIG. 2 illustrates the physical configuration of the entire system.

Regarding the information system 101, the cloud platform 102 Includes a gateway 206, a controller 199, and a plurality of computers 201 (node computers). The gateway 206 is connected to an external network 207 and an internal network 205 of the information system 101. The controller 199 may be a device that controls the cloud platform 102, and may be, for example, a master computer 201. A plurality of distributed microservices are arranged in a plurality of computers 201. The controller 199 and the plurality of computers 201 are connected to the internal network 205.

The data source system 107 includes a gateway 290 and a data source device 108. The gateway 290 is connected to the external network 207 and an internal network 211 of the data source system 107. The data source device 108 is connected to the internal network 211. The data source device 108 transmits data to the information system 101 via the internal network 211 and a gateway 209.

FIG. 3 illustrates the physical configuration of the computer 201.

An interface device 306, a secondary memory 303 (for example, a persistent, storage device), a primary memory 302 (for example, a memory), and a processor 305 connected to them are included. The interface device 306 is connected to the internal network 205.

A container is arranged in the computer 201, and the microservice 903 or the security service 1601 is arranged in the container. The microservice 903 or the security service 1601 is executed in the container arranged in the computer 201.

FIG. 4 illustrates the configuration of the security management DB 113.

The security management DB 113 has a record for each security service. Each record stores information such as type 411, version 412, target protocol 413, valid setting 414, and deployment setting 415.

The type 411 represents the type of the security service. The version 412 represents the version of the security service. The target protocol 413 represents a communication protocol that can be used for communication performed by the security service. The valid setting 414 represents at least one of a security service setting file and a setting parameter. The deployment setting 415 represents a setting for installing a container and realizing a security service by deploying the security service image.

Figure 5:
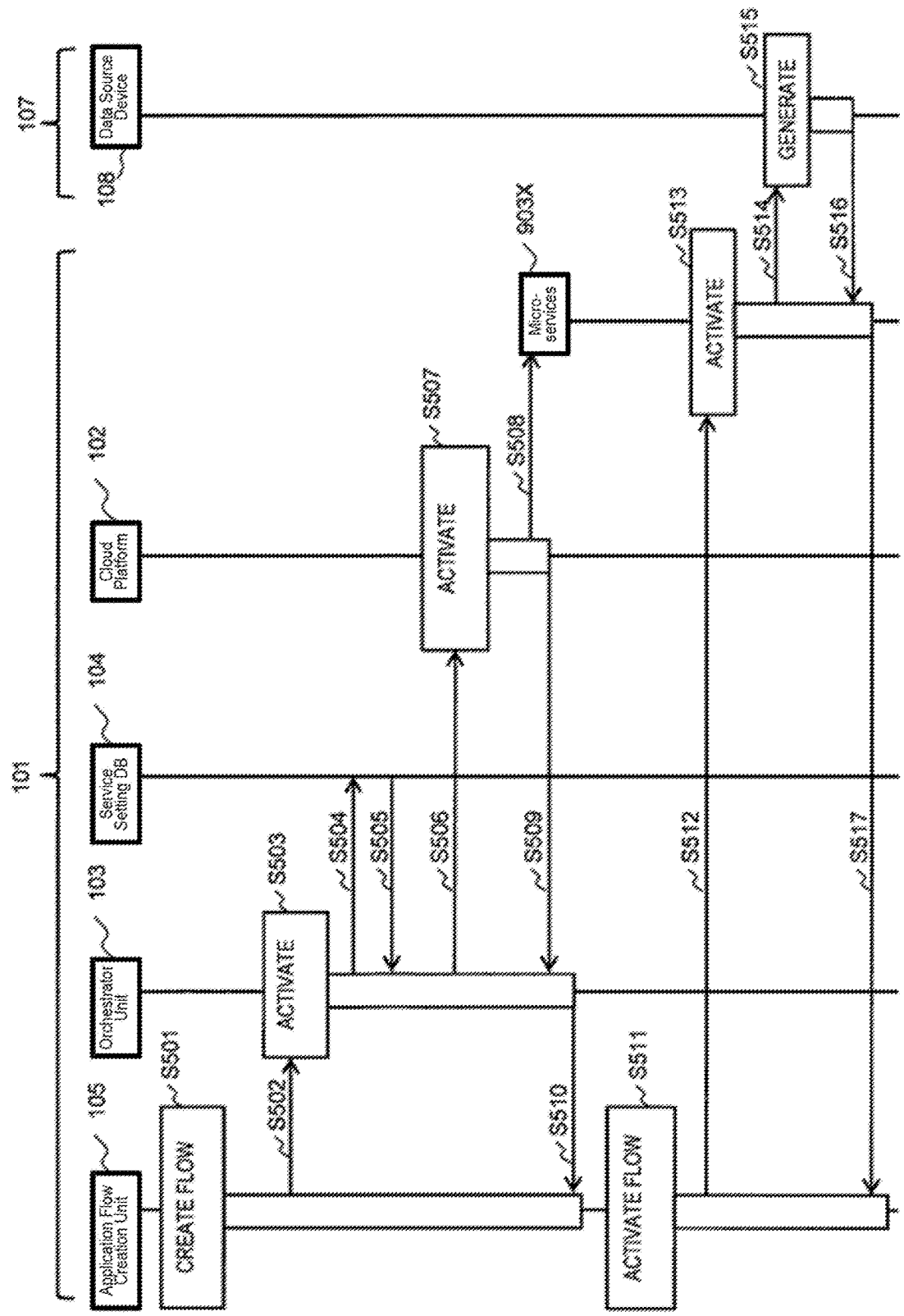
FIG. 5 is a diagram illustrating an example of a process related to the deployment of an application package.

FIG. 5 illustrates an example of a process related to the deployment of the application package 10.

The application flow creation unit 105 creates an application flow (S501).

The orchestrator unit 103 receives from the application flow creation unit 105 a deployment request associated with information representing the application flow (S502). The orchestrator unit 103 is activated (S503), and for each node in the application flow, queries the service setting DB 104 for the meta information entity of the microservice 903 corresponding to the node (S504), and receives the meta information entity from the service setting DB 104 (S505).

The orchestrator unit 103 deploys the application package 10 including the microservice image for each node on the cloud platform 102 (S506). The cloud platform 102 is activated (S507), creates a container, and creates the microservice 903 in the container (S508). In this way, the application is realized on the cloud platform 102. FIG. 5 illustrates a microservice 903X in the realized application.

The cloud platform 102 returns the realization completion of the application to the orchestrator unit 103 (S509). The orchestrator unit 103 returns deployment completion (S510).

For example, the application flow creation unit 105 receives a flow start instruction from an operator, and requests for each node in the application flow 901 as to the service corresponding to the node (S512). For example, the microservice 903X is activated in response to the request (S513) and requests data from the data source device 108 (S514). The data source device 108 generates data (S515) and returns the data (S516). The microservice 903X returns the data to the application flow creation unit 105 (S517).

Figure 6A:
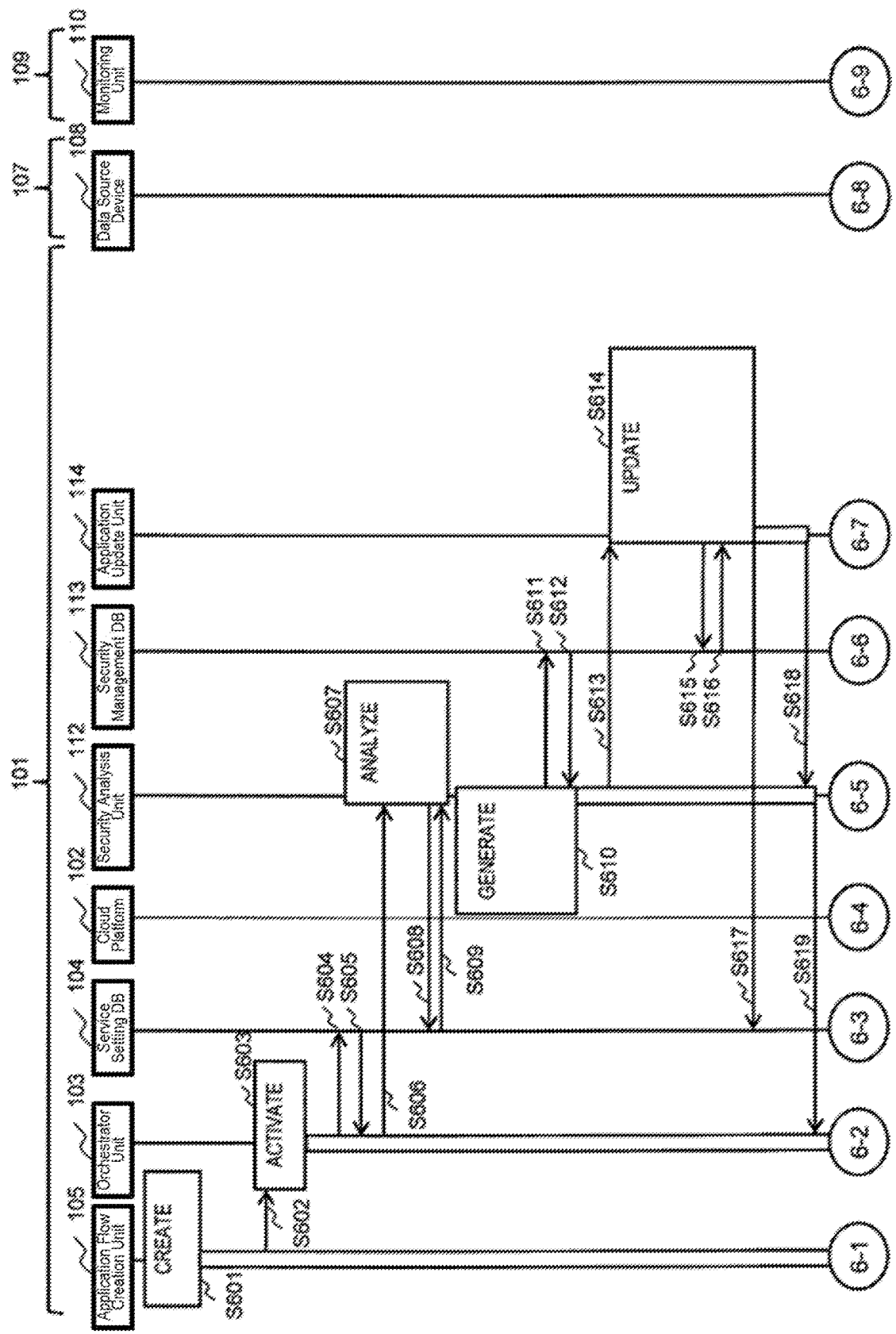
FIG. 6A is a diagram illustrating the first part of an example of a process related to the deployment of an updated application package.
Figure 6B:
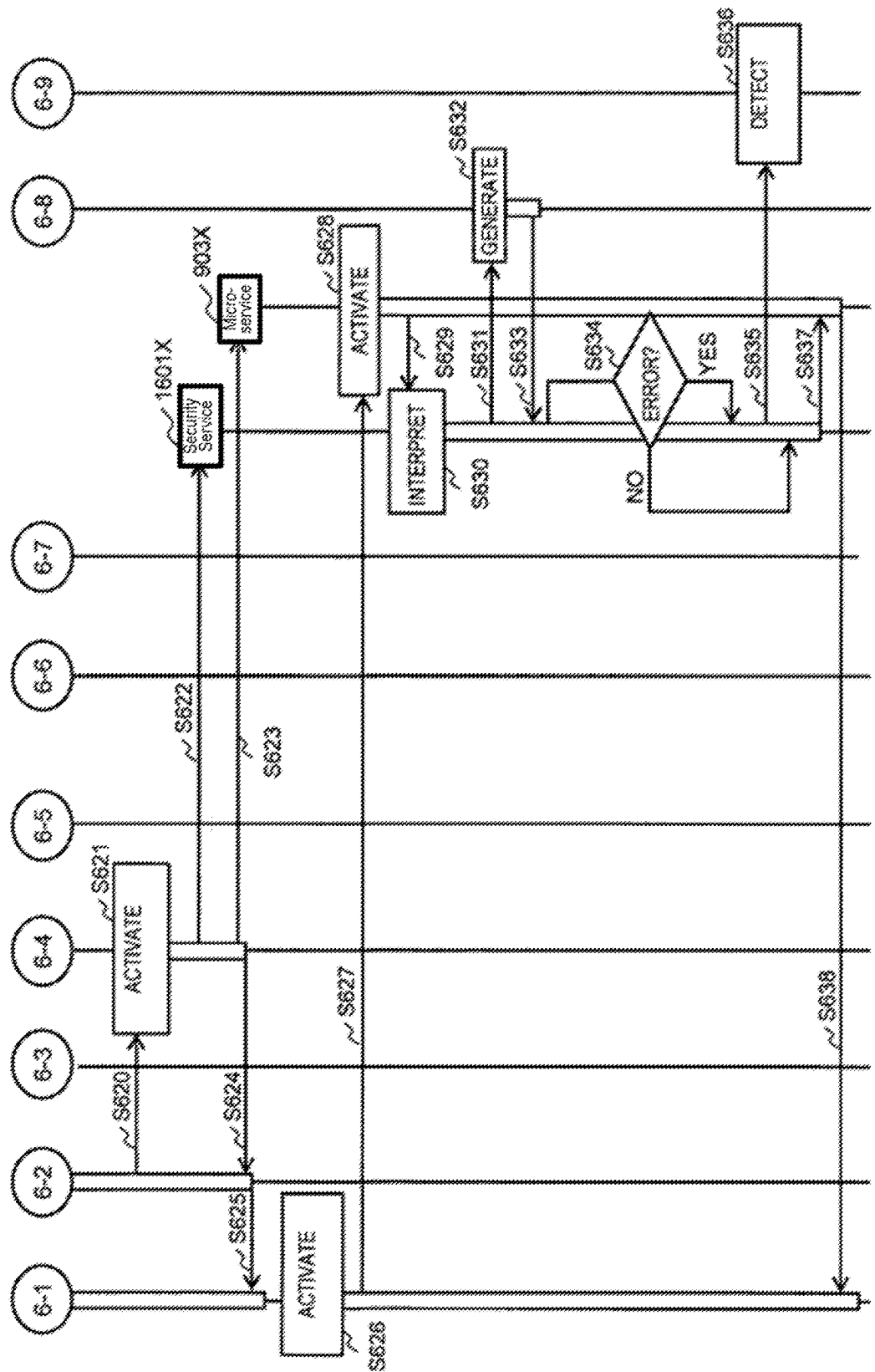
FIG. 6B is a diagram illustrating the second part of an example of a process related to the deployment of an updated application package.

FIGS. 6A and 6B illustrate an example of a process related to deployment of the updated application package 16.

The same processes as S501 to S505 are performed (S601 to S605).

The orchestrator unit 103 transmits a security analysis request that associates the information representing the application flow with the meta information entity acquired in S605 for each node of the application flow to the security analysis unit 112 (S606).

The security analysis unit 112 analyzes the application according to the application flow based on the information associated with the security analysis request (S607). In the analysis, the security analysis unit 112 accesses the service setting DB 104 (S608) and acquires information from the service setting DB 104 (S609) if necessary. The security analysis unit 112 identifies a security risk based on the analysis result, determines one or more security services including a security service that reduces the security risk, and generates an analysis result table representing each piece of information of the one or more security services (S610). Therefore, the security analysis unit 112 accesses the security management DB 113 (S611) and acquires information from the security management DB 113 (S612).

The application update unit 114 receives the analysis result table from the security analysis unit 112 (S613) and performs the application update process (S614). In the application update process, the application update unit 114 specifies one or more security services from the analysis result table, accesses the security management DB 113 for each of the one or more security services (S615), and acquires information from the security management DB 113 (S616). In the application update process, the application update unit 114 writes the meta information entity in the service setting DB 104 for each of the one or more security services (S617).

The application update unit 114 returns completion to the security analysis unit 112 (S618). The security analysis unit 112 returns completion to the orchestrator unit 103 (S619).

The orchestrator unit 103 deploys the updated application package 16, which includes the microservice image for each node in the application flow 901 and each security service image of one or more security services, to the cloud platform 102 (S620). The cloud platform 102 is activated (S621), generates a container of the security service 1601 and generates the security service 1601 in the container (S622), generates a container of the microservice 903, and generates the microservice 903 in the container (S623). In this way, the updated application is realized on the cloud platform 102. FIG. 6B illustrates the security service 1601X and the microservice 903X in the realized application.

The cloud platform 102 returns realization completion of the updated application to the orchestrator unit 103 (S624). The orchestrator unit 103 returns deployment completion (S625).

For example, the application flow creation unit 105 receives a flow start instruction from an operator, and requests for each node in the application flow 901 as to the service corresponding to the node (S627). For example, the microservice 903X is activated in response to the request (S628) and transmits a data transmission request to the security service 1601X (S629). The security service 1601X interprets the request (S630) and transmits the data transmission request to the data source device 108 (3631). The data source device 108 generates data (S632) and returns the data (S633). The security service 1601X checks whether the data meets a predetermined error condition (for example, a condition corresponding to a threat) (S634). If there is an error (S634: YES), the security service 1601X transmits an alert indicating an error content to the monitoring unit 110 of the external system 109 (S635). The monitoring unit 110 detects (and visualizes) the alert (S636).

After S635 or when there is no error (S634: NO), the security service 1601X returns the data received from the data source device 108 to the microservice 903X (S637). The microservice 903X returns the result to the application flow creation unit 105 (S638).

FIG. 7 illustrates an example of the analysis result table.

An analysis result table 700 includes information such as an application flow ID 711, the number of security services 712, and a security service entry 713.

The application flow ID 711 represents the ID of the application flow analyzed by the security analysis unit 112.

The number of security services 712 represents the number of security services determined to be added to the application in the analysis.

The number of security service entries 713 is the same as the value represented by the number of security services 712. According to the example of FIG. 7, since the value of the number of security services 712 is "2", there are two security service entries 713A and 713B. The one security service entry 713A will be taken as an example.

The security service entry 713A includes information such as security service type 71, security service version 72, corresponding service ID 73, the number of setting parameters 74, setting parameter entry 75, the number of setting files 76, and setting file entry 77.

The security service type 71 represents the type of the security service. The security service type 71 follows the type 411 illustrated in FIG. 4.

The security service version 72 represents the version of the security service. The security service version 72 follows the version 412 illustrated in FIG. 4.

The corresponding service ID 73 represents the ID of the microservice to which the security service is applied (for example, the security service is arranged in the data flow such that it precedes the microservice). A microservice to which a security service is applied is a microservice detected as a security risk in the analysis.

The number of setting parameters 74 represents the number of setting parameters. The number of setting parameters follows the number of setting parameters represented by the valid setting 414 illustrated in FIG. 4. According to the example of FIG. 7, since the value of the number of setting parameters 74 is "2", there are two setting parameter entries 75A and 75B. The one setting parameter entry 75A will be taken as an example.

The setting parameter entry 75A includes information such as a parameter name 81 and a parameter value 82. The parameter name 81 and the parameter value 82 are determined by a predetermined method for the setting parameter represented by the valid setting 414 illustrated in FIG. 4. For example, in the valid setting 414, the parameter name and the parameter value may be described, and these parameter name and parameter value may be set as the parameter name 81 and the parameter value 82.

The number of setting files 76 represents the number of setting files. The number of setting files follows the number of setting files represented by the valid setting 414 illustrated in FIG. 4. According to the example of FIG. 7, since the value of the number of setting files 76 is "2", there are two setting file entries 77A and 77B. The one setting file entry 77A will be taken as an example.

The setting file entry 77A contains information such as a path name 84 and a file content 85. The path name 84 and the file content 85 are determined by a predetermined method for the setting file represented by the valid setting 414 illustrated in FIG. 4. For example, a path name may be described in the valid setting 414, the path name may be set as the path name 84, and the content of the setting file specified from the path name may be set as the file content 85.

Figure 8:
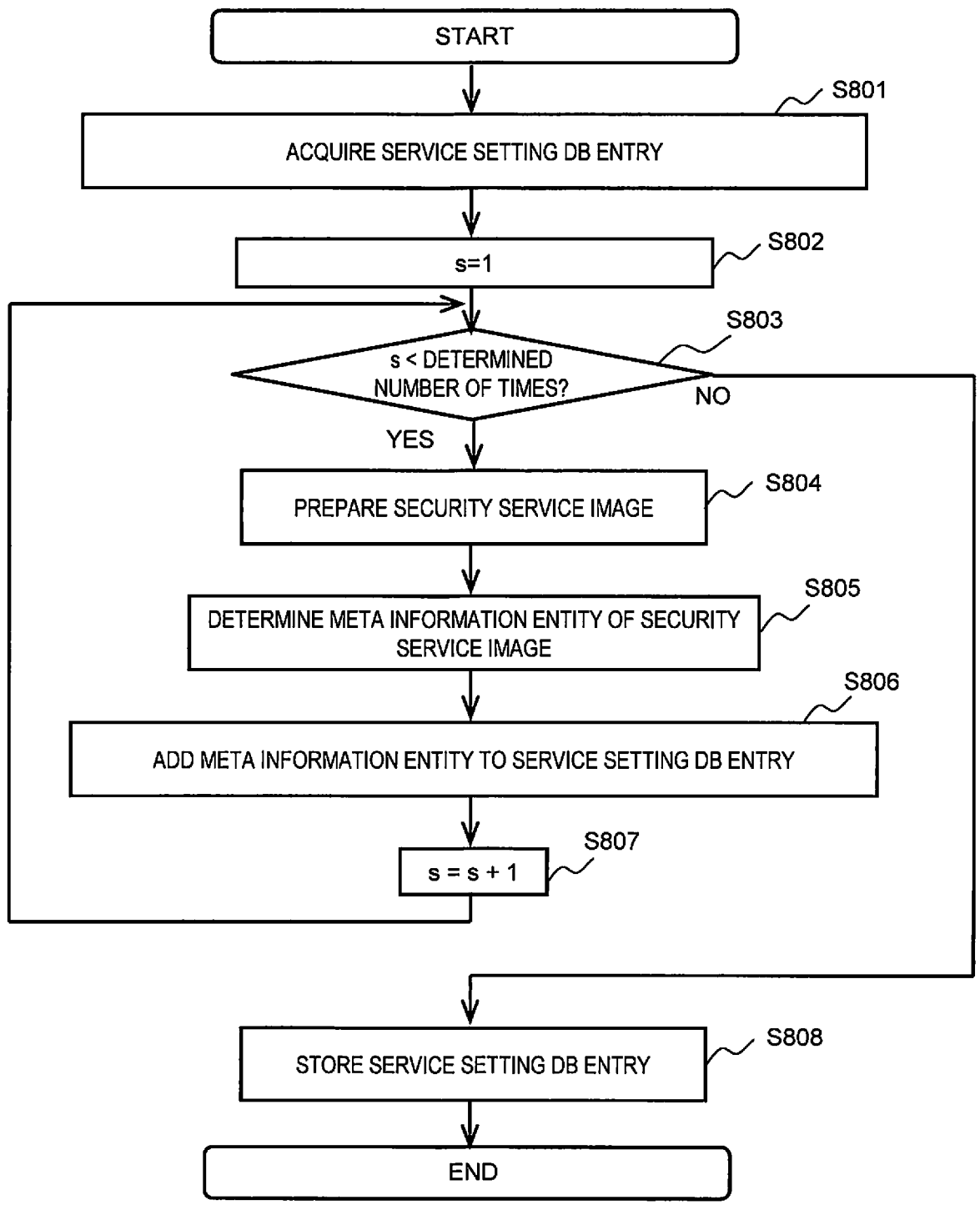
FIG. 8 is a diagram illustrating an update process of a service setting DB entry.

FIG. 8 illustrates an update process of the service setting DB entry.

This process is performed when the application update unit 114 receives the analysis result table 700 from the security analysis unit 112. The update process of the service setting DB entry is performed for each microservice represented by the analysis result table 700, that is, for each microservice determined to require the application of at least one security service. One microservice will be taken as an example ("target microservice" in the description of FIG. 8).

The application update unit 114 acquires a service setting DB entry 1100X corresponding to the target microservice (corresponding service ID 73 included in the analysis result table 700) from the service setting DB 104 (S801). FIG. 11 illustrates an example of the acquired service setting DB entry 1100X. The service setting DB entry 1100X will be described later.

The application update unit 114 substitutes 1 into the variable s (S802). The variable s is the number of security services selected in this update process for the target microservice.

The application update unit 114 determines whether the variable s is less than the determined number of times (S803). The "determined number of times" is the number of security services represented by the analysis result table 700 for the target microservice, that is, the number of security services determined to require the application of the target microservice.

If the determination result in S803 is true (S803: YES), the application update unit 114 prepares an image of the security service (S804), determines the meta information entity of the security service, and determines the updated meta information entity of the meta information entity in the service setting DB entry 1100X (S805). The meta information entity is determined based on the security service entry 713 (see FIG. 7) corresponding to the security service and the deployment setting 415 (see FIG. 4) corresponding to the security service. The application update unit 114 adds the meta information entity determined in S805 to the service setting DB entry 1100X (S806). The application update unit 114 adds 1 to the variable s (S807) and performs S803.

If the determination result in S803 is false (S803: NO), the variable s has reached the determined number of times, that is, S804 to S806 have been performed for all security services determined to require the application of the target microservice. In this case, the service setting DB entry of the target microservice is a service setting DB entry 1100Y illustrated in FIG. 15. That is, there is a service setting DB entry 1100Y in which the meta information entity is recorded for each of all the security services determined to require the application of the target microservice. The application update unit 114 stores the service setting DB entry 1100Y in the service setting DB 104 (S808).

Figure 9:
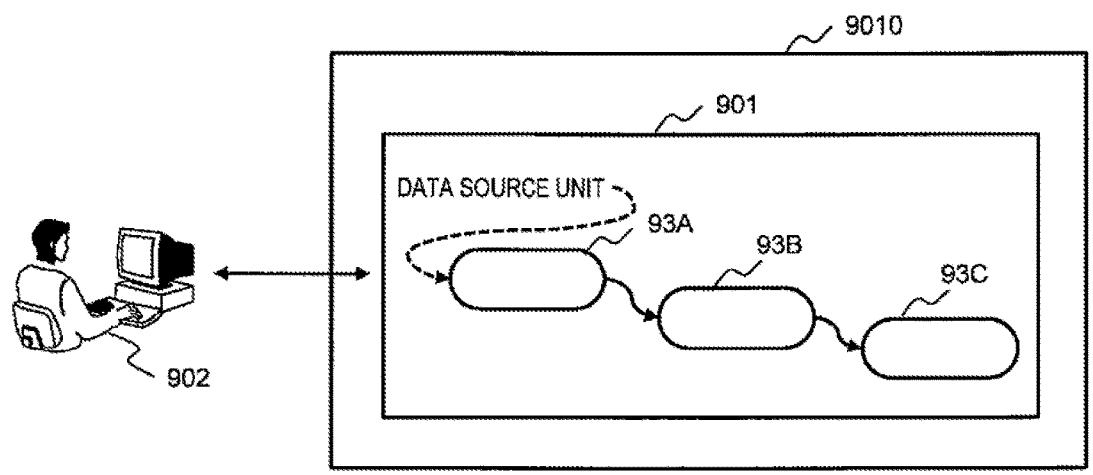
FIG. 9 is a diagram schematically illustrating the creation of an application flow.

FIG. 9 schematically illustrates the creation of an application flow.

A GUI (Graphical User Interface) 9010 provided by the application flow creation unit 105 is displayed on an information processing terminal used by an operator 902. The operator 902 creates the application flow 901 on the GUI 9010. The application flow 901 follows the graph structure built in the GUI 9010. For example, three microservices 903A to 903C (see FIG. 10) correspond to the nodes 93A to 93C, respectively.

Figure 10:
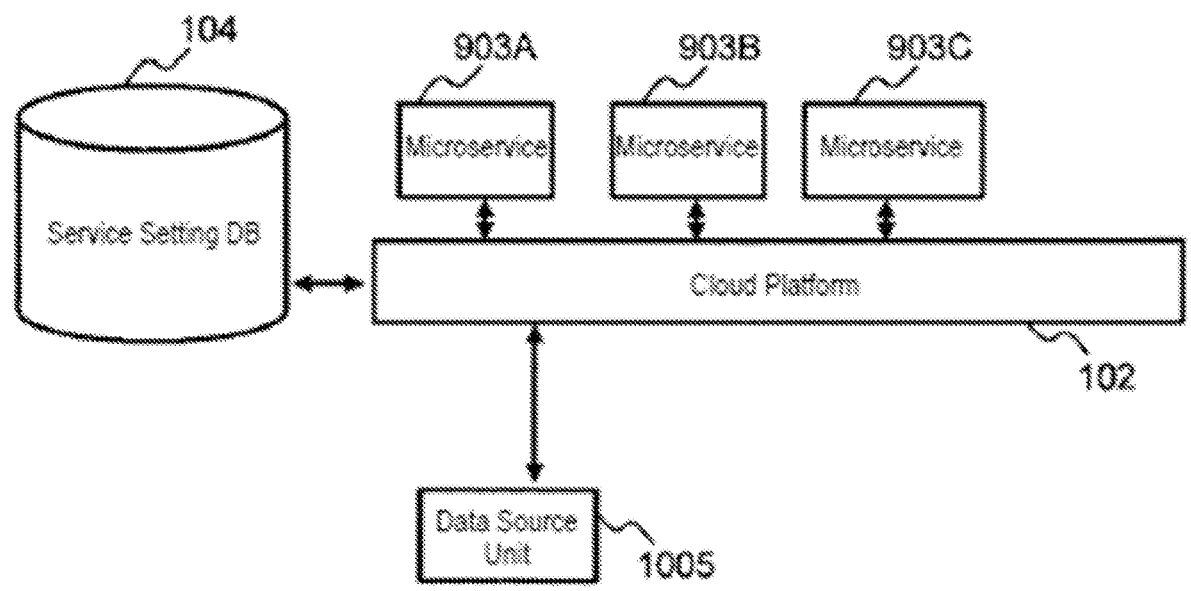
FIG. 10 is a diagram illustrating a logical configuration related to execution of an application.

FIG. 10 illustrates a logical configuration related to the execution of the application 20.

The microservices 903A to 903C are executed on the cloud platform 102. The application 20 is an application to which a security service has not been added. The microservice 903A receives data from the data source unit 1005.

FIG. 11 illustrates an example of the service setting DB entry 1100X of the microservice in the application 20.

The service setting DB entry 1100 includes information such as service ID 1101, the number of service settings 1102, and service setting entry 1103.

The service ID 1101 represents the ID of the microservice. The number of service settings 1102 represents the number of service setting entries 1103. According to the example of FIG. 11, since there are two service setting entries 1103A and 1103B, the value of the number of service settings 1102 is "2".

The service setting entry 1103A includes information such as setting type 41, external port 42, and internal port 43.

The setting type 41 represents the type of setting. The setting type 41 "Service" means, for example, a setting for a port for input/output of microservice data.

The external port 42 represents the number of the port provided to the outside of the cloud partition in which the microservice is executed (that is, the port for the outside). The internal port 43 represents the number of the port provided inside the cloud partition in which the microservice is executed (that is, the port for the inside).

The service setting entry 1103B includes information such as setting type 44, the number of times of deployment 45, shared volume 46, the number of containers 47, and container entry 48.

The setting type 44 represents the type of setting. The setting type 44 "Deployment" means, for example, a setting for deploying a microservice image.

The number of times of deployment 45 represents the number of deployed microservice images. The shared volume 46 is information about a shared volume (storage area) used for microservices.

The number of containers 47 represents the number of containers arranged in the cloud partition in which the microservice is executed. According to the example of FIG. 11, since the value of the number of containers 47 is "1", there is one container entry 48A.

The container entry 48A includes information such as container name 49, container image name 50, and publication port 51. The container name 49 represents the name of a container. The container image name 50 represents the name of a container image. The publication port 51 represents the port number provided by a container. According to the example of FIG. 11, since the internal port 43 and the publication port 51 have the same number "9200", the external port is the publication port of the container. Specifically, according to the example of FIG. 11, the access is performed as outside→external port (42)→internal port (43)→publication port (51)→container (#1).

Figure 12:
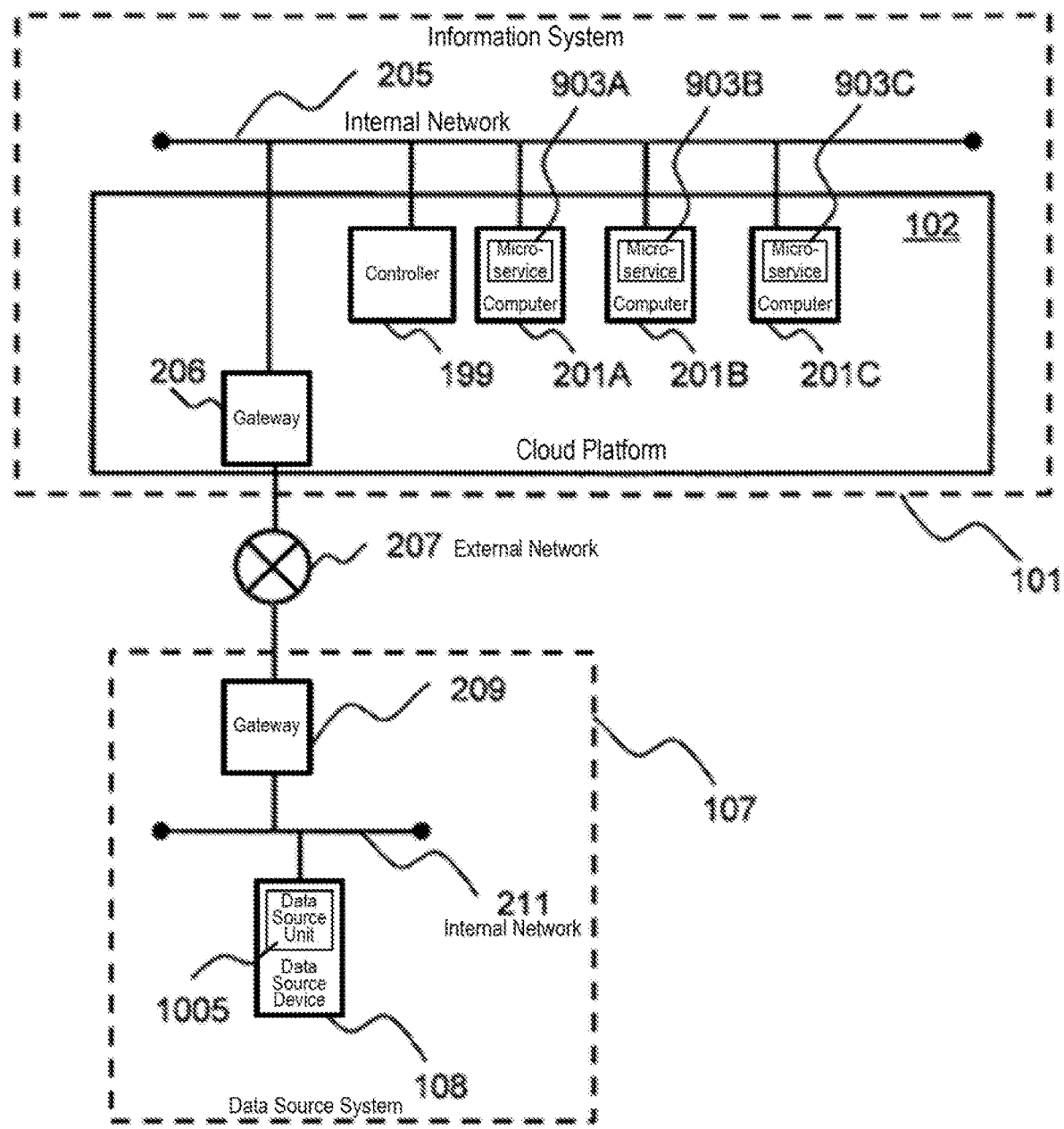
FIG. 12 is a diagram illustrating an example of a service arrangement of an application.

FIG. 12 illustrates an example of the service arrangement of the application 20.

When the application package to which the security service is not added is deployed, the service arrangement illustrated in FIG. 12, for example, is realized. That is, the microservices 903A to 903C are distributed to computers 201A to 201C in the cloud platform 102. Further, the data source unit 1005 is executed in the data source device 108. The data source unit 1005 transmits data to the information system 101.

Figure 13:
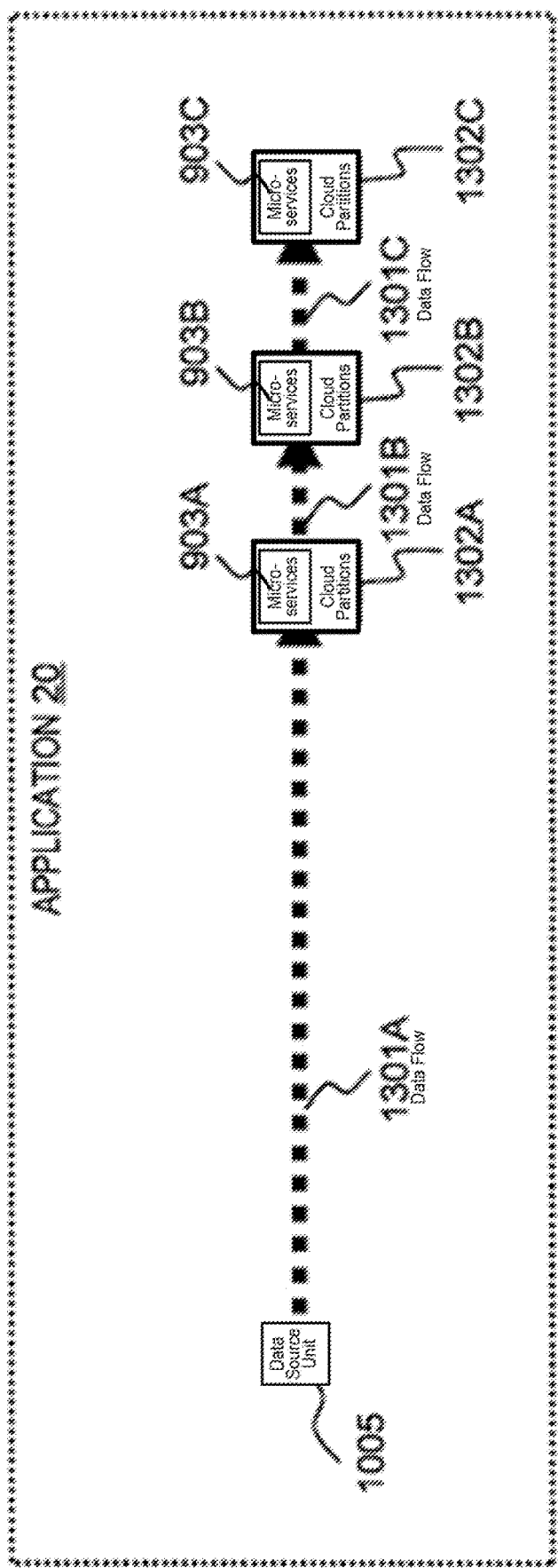
FIG. 13 is a diagram illustrating an example of the configuration of an application.

FIG. 13 illustrates an example of the configuration of the application 20.

The application 20 is an application to which the security service is not added, as described above. Therefore, the configuration of the application 20 is the same as the configuration represented by the application flow. That is, the microservice 903A receives data from the data source unit 1005, the microservice 903B receives data from the microservice 903A, and the microservice 903C receives data from the microservice 903B. Further, there are the data flow 1301A from the data source unit 1005 to the microservice 903A, the data flow 1301B from the microservice 903A to the microservice 903B, and the data flow 1301C from the microservice 903B to the microservice 903C. The microservices 903A to 903C are arranged in cloud partitions 1302A to 1302C, respectively.

Figure 14:
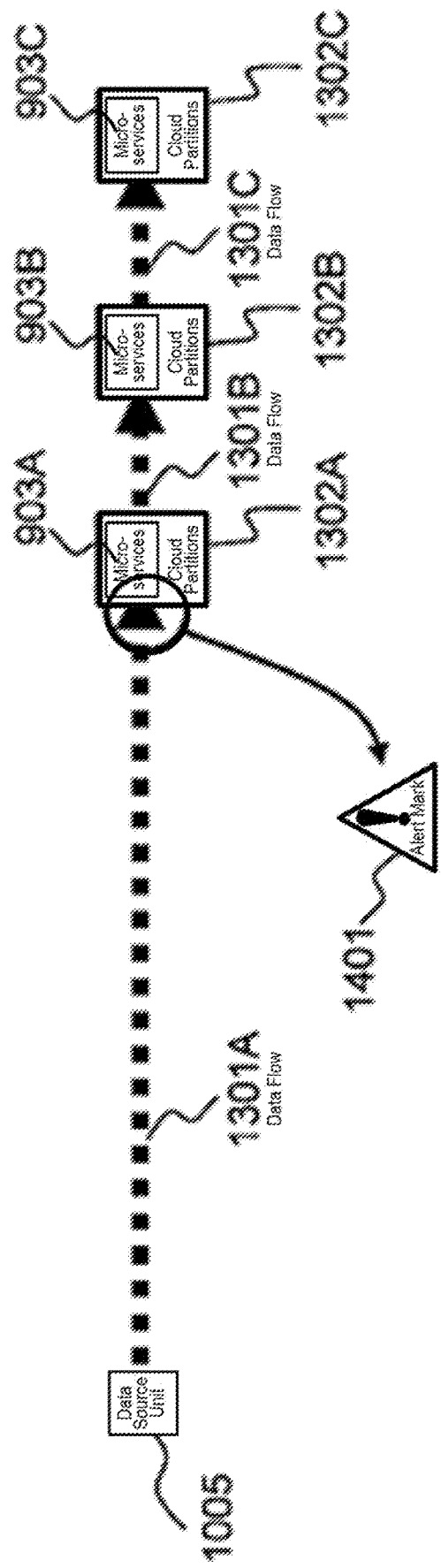
FIG. 14 is a diagram illustrating an example visualizing the analysis results of an application.

FIG. 14 illustrates an example of visualization of the analysis result of the application 20.

When the security analysis unit 112 determines that the microservice 903A has a security risk, an alert mark 1401 indicating the security risk may be displayed on the information processing terminal of the operator 902 (see FIG. 9), for example.

FIG. 15 illustrates an example of the service setting DB entry 1100Y of the microservice in the updated application 21.

Differences from the service setting DB entry 1100X illustrated in FIG. 11 are as follows.

The value of internal port 43 has been updated from "9200" to "8001".

A volume name 52 is added to the shared volume 46. That is, the updated application 21 uses the shared volume.

The value of the number of containers 47 has been updated from "1" to "3".

The container entries 48, the number of which is the same as the number of the security services added to the cloud partition of the microservice, are added. According to the example of FIG. 15, since two security services are added, two container entries 48B and 48C are added.

The container entry 48B is an entry corresponding to a first security service. The container entry 48B includes information such as container name 53, container image name 54, publication port 55, shared volume mount 56, and environment variable 57. The container name 53 represents the name of a container. According to the container name "WAF", it can be seen that the first security service is a web application firewall. The container image name 54 represents the name of a container image. The publication port 55 represents the number of port provided by the container. According to the example of FIG. 11, since the internal port 43 and the publication port 55 have the same number "8001", the data input from the external port "9200" is input to the internal port "3001". The shared volume mount 56 is information related to mounting of the shared volume "WAF-logs" on the first security service, and includes a volume name 58 and a mount path 59. The environment variable 57 includes one or more variables (a set of variable name 61 and variable value 62) used for the operation of the first security service. According to the example in FIG. 15, the access is performed as outside→external port (42)→internal port (43)→publication port (55)→container (#2)→specify "9200" from variable value (62)→publication port (51)→container (#1).

The container entry 48C is an entry corresponding to a second security service. The container entry 48C includes information such as container name 63, container image name 64, shared volume mount 66, and environment variable 67. The container name 63 represents the name of a container. According to the container name "Log-collector", it can be seen that the second security service is a log collection. The container image name 64 represents the name of a container image. The shared volume mount 66 is information related to mounting of the shared volume "WAF-logs" on the second security service, and includes a volume name 58 and a mount path 59. According to the example of FIG. 15, the shared volume "WAF-logs" is used between the first security service and the second security service. The environment variable 67 includes one or more variables (a set of variable name 91 and variable value 92) used for the operation of the second security service.

Figure 16:
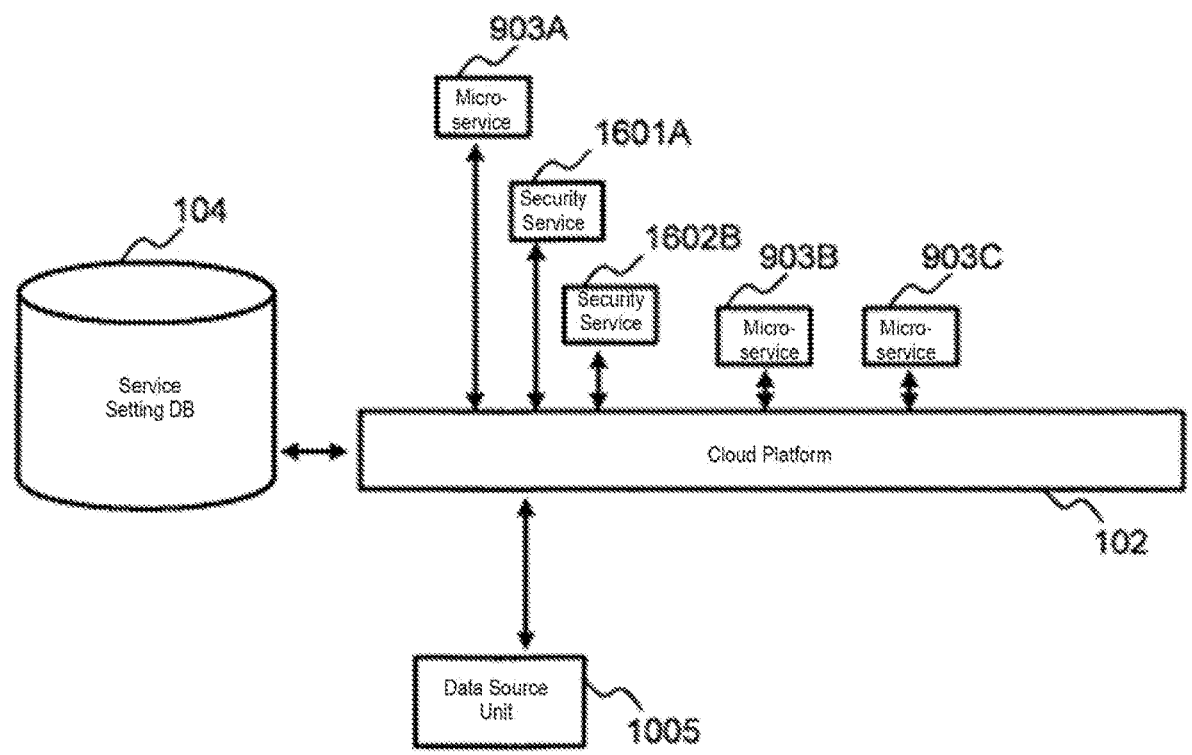
FIG. 16 is a diagram illustrating a logical configuration related to the execution of an updated application.

FIG. 16 illustrates a logical configuration related to the execution of the updated application 21.

Comparing with FIG. 10, security services 1601A and 1602B are added to the cloud plat forts 102.

Figure 17:
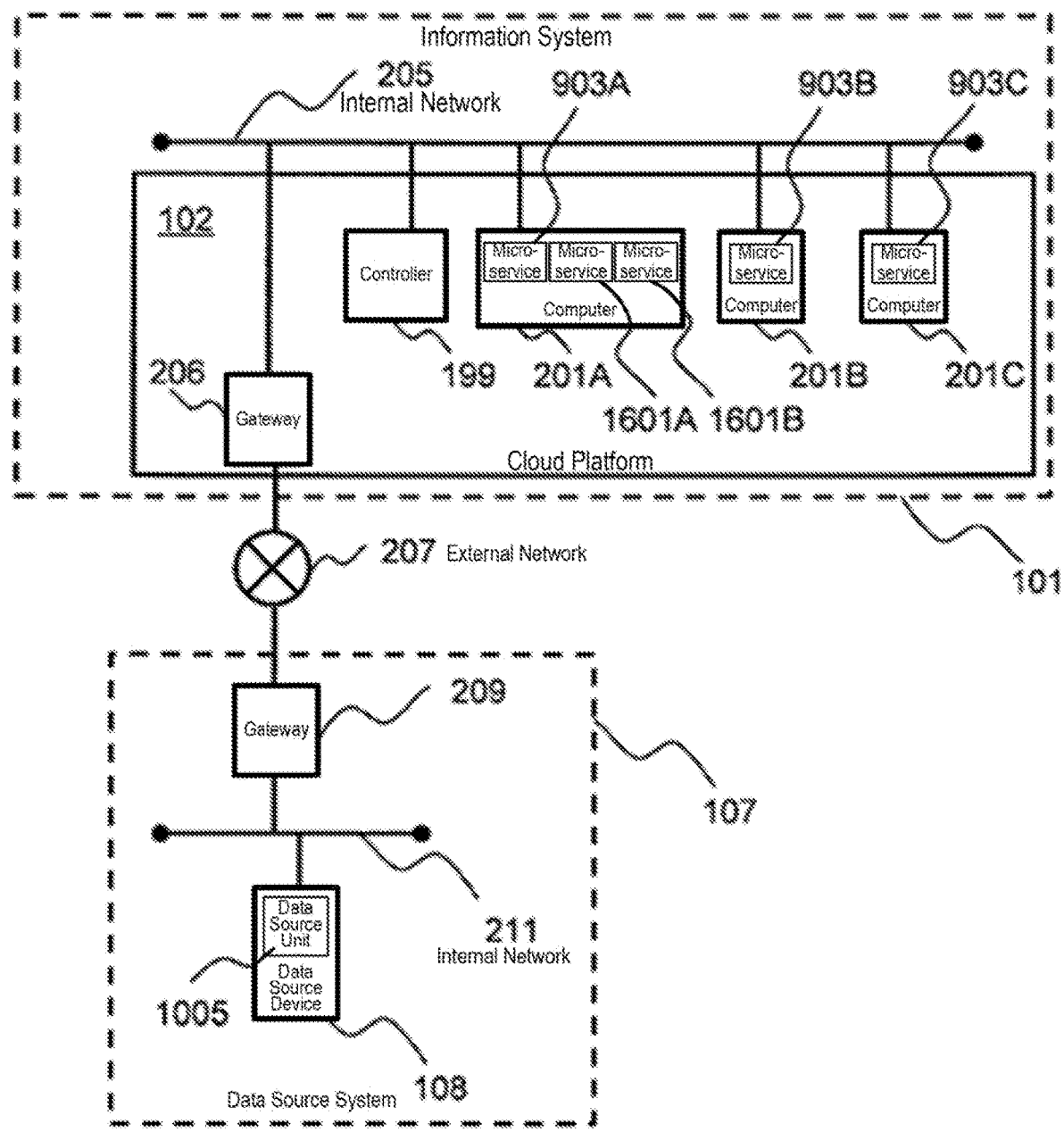
FIG. 17 is a diagram illustrating an example of a service arrangement of an updated application.

FIG. 17 illustrates an example of service arrangement of the updated application 21.

According to comparison with FIG. 12, the security services 1601A and 1602B are added to the computer 201A. The computer 201A is the calculation resource range as the cloud partition 1302A.

Figure 18:
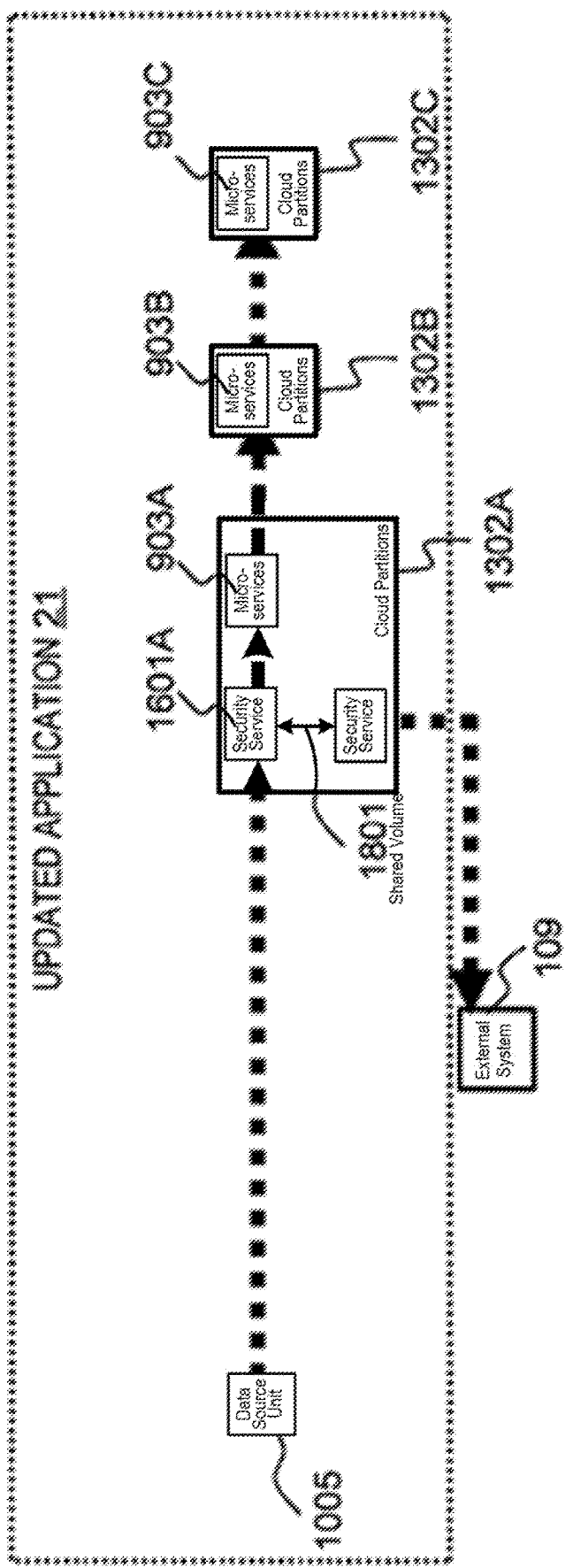
FIG. 18 is a diagram illustrating an example of the configuration of an updated application.

FIG. 18 illustrates an example of the configuration of the updated application 21.

According to comparison with FIG. 13, the security services 1601A and 1602B are added to the cloud partition 1302A. Referring to the service setting DB entry 1100Y illustrated in FIG. 15, the following configuration is obtained for example.

The port provided to the data source unit 1005 remains as the external port "9200".

The first security service 1601A receives data input to the external port "9200" via the internal port "8001". The first security service 1601A checks the received data and outputs the checked data. The output data is input to the microservice 903A.

Reference numeral 1801 corresponds to the shared volume "WAF-logs". The first security service 1601A stores the log indicating the check result in the shared volume "WAF-logs". The second security service 1601B acquires the log from the shared volume "WAF-logs".

The second security service 1601B transmits the acquired log to the external system 109. The address of the external system 109 may be set in advance in the second security service 1601B, or may be set in the meta information entity (for example, environment variable 67) of the second security service 1601B.

The updated application 21 is realized in the cloud platform 102 by the orchestrator unit 103 deploying the updated application package 16 updated (repackaged) in the cloud platform 102 based on the analysis result table 700 and the security management DB 113. The setting information 12 in the updated application package 16 includes the service setting DB entry 1100Y updated and stored in the service setting DB 104. Further, the microservice image 11 and the security service image 17 are also stored in the service setting DB 104.

Instead of realizing the security service 1601 by deploying the updated application package 16, the application 20 may be changed to the updated application 21 by adding the security service 1601 to the application 20 after the application 20 is realized by deploying the application package 10.

[Second Embodiment]

A second embodiment will be described. At that time, differences from the first embodiment will be mainly described, and description of common points with the first embodiment will be omitted or simplified.

Figure 19:
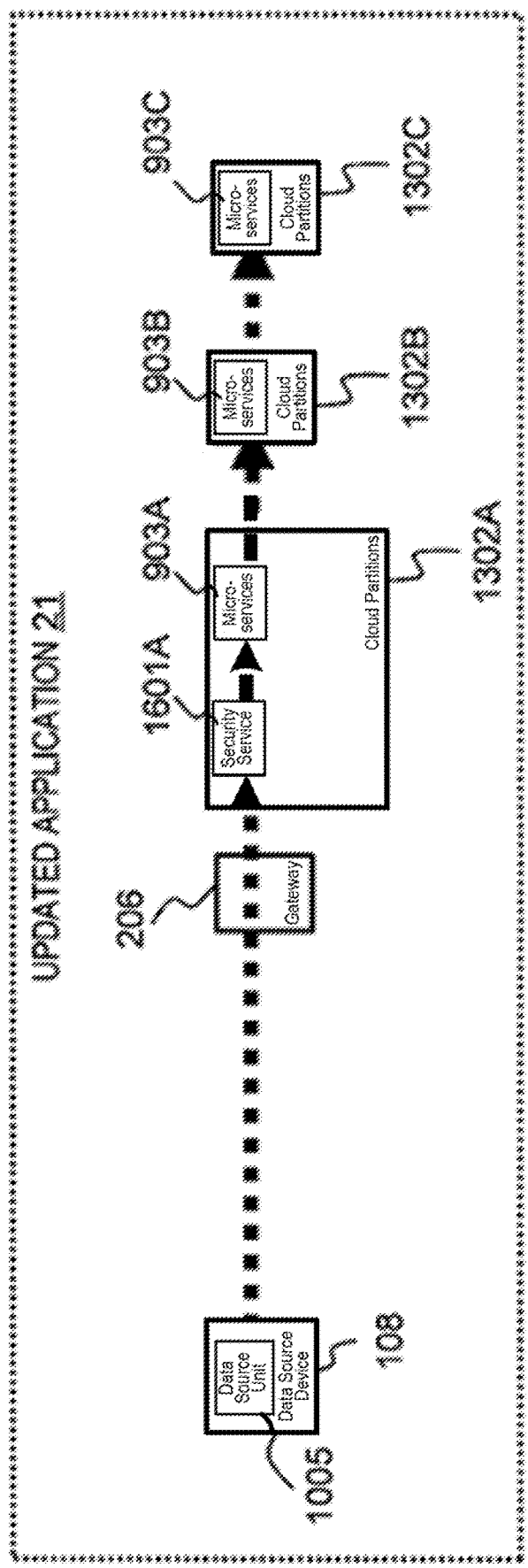
FIG. 19 is a diagram illustrating an example of the configuration of an updated application according to a second embodiment.

FIG. 19 illustrates an example of the configuration of the updated application 21 according to the second embodiment.

In addition to adding the security service 1601 to the application 20, the application update unit 114 may delete the security service 1601 from the updated application 21 or update the security service 1601 in the updated application 21. According to the example of FIG. 19, the second security service 1601B has been deleted. The omission of the security service 1601 from the updated application 21 and the updating of the security service 1601 in the updated application 21 may be performed on the updated application 21. After the updated application 21 is omitted from the cloud platform 102, the updated application package 16 in which the security service 1601 is omitted or updated may be deployed on the cloud platform 102.

[Third Embodiment]

A third embodiment will be described. At that time, differences from the second embodiment will be mainly described, and description of common points with the second embodiment will be omitted or simplified.

Figure 20:
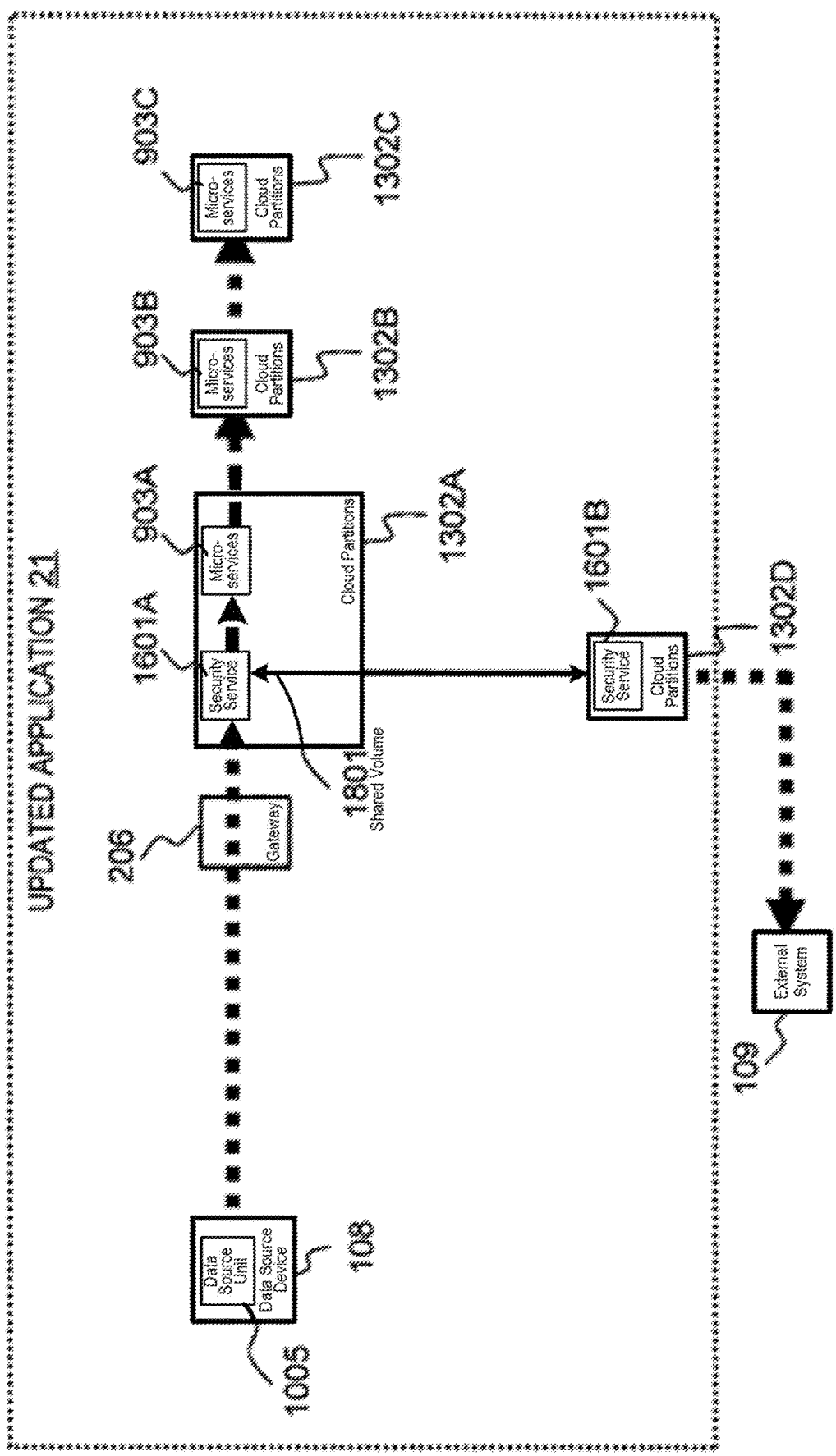
FIG. 20 is a diagram illustrating an example of the configuration of an updated application according to a third embodiment.

FIG. 20 illustrates an example of the configuration of the updated application 21 according to the third embodiment.

At least one of the one or more security services 1601 for the microservice 903A, which is an example of the risk microservice (that is, a microservice deemed a security risk by the security analysis), may be arranged in a cloud partition 1302 different from the cloud partition 1302A of the microservice 903A. For a security service arranged in the cloud partition 1302 different from the cloud partition 1302A of the microservice 903A, for example, the application update unit 114 may generate the service setting DB entry 1100 for the security service and store the service setting DB entry 1100 in the service setting DB 104.

The application update unit 114 may determine, for each security service 1601 of the microservice 903A, whether the arrangement destination of the security service 1601 is the cloud partition 1302A, based on the type of the security service 1601. For example, if the type of the security service 1601 is a type that needs to receive data input to the microservice 903A (for example, it needs to be received at the preceding stage of the microservice 903A before being input to the microservice 903A), the application update unit 114 determines an arrangement destination of the security service 1601 in the cloud partition 1302A in order not to change the number of the external port (an example of an interface) with respect to the input source of the microservice 903A. On the other hand, if the type of the security service 1601 is a type that does not need to receive data input to the microservice 903A, the application update unit 114 determines that the arrangement destination of the security service 1601 is in another cloud partition (for example, the cloud partition 1302D).

Figure 22:
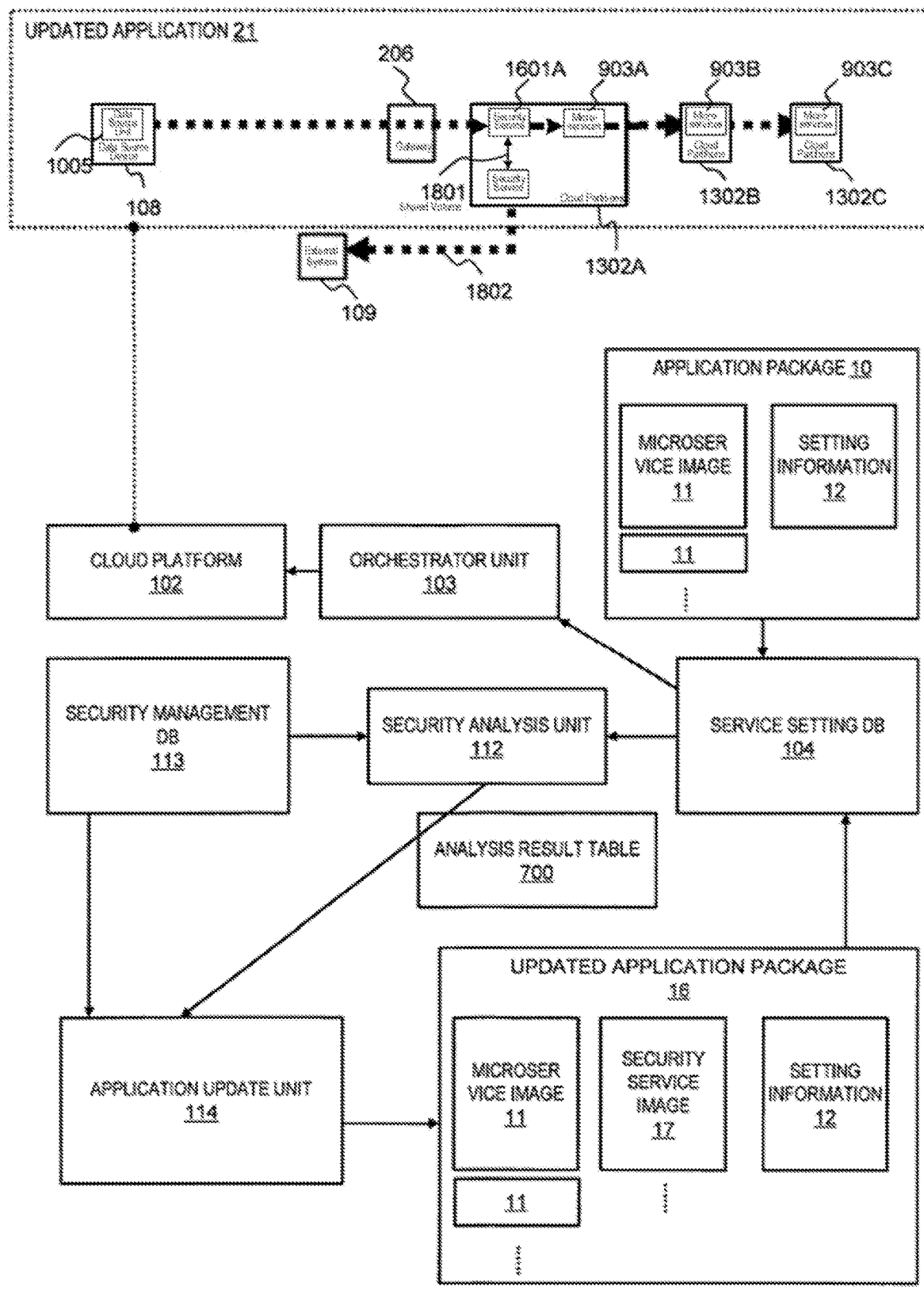
FIG. 22 is a diagram illustrating an example of the outline of the first to third embodiments.

The above is a description of the first to third embodiments. The first to third embodiments can be summarized as follows with reference to FIG. 22, for example.

The security risk reduction system includes the security management DB 113 and the application update unit 114.

The security management DB 113 includes meta information for each of the plurality of security services 1601. For each security service 1601, an example of the meta information may be all or part of the information included in the record (see FIG. 4) corresponding to the security service 1601.

The application update unit 114 performs the application update process based on the security management DB 113. The application update process is a process for adding one or more security services 1601 including a security service 1601 that reduces the security risk of the application 20 having a plurality of distributed microservices 903 having a graph structure relationship to the application.

According to this security risk reduction system, the security service 1601 for reducing the security risk is added to the application to realize the updated application 21. Therefore, whether the security risk of the application 20 is reduced does not depend on the environment in which the application 20 is realized (for example, the cloud platform 102).

The application update process may be a process of updating the application package 10 which includes the plurality of microservice images 11 corresponding to the plurality of microservices 903. Specifically, the application update process may include generating the updated application package 16 by adding one or more security service images 17 respectively corresponding to the one or more security services 1601 to the application package 10. The updated application 21 is realized by deploying the updated application package 16. According to this security risk reduction system, an updated application package 16 including the image 17 of the security service 1601 that reduces security risks is generated before the application package 10 is deployed, and the updated application package 16 is deployed in place of the application package 10. As a result, whether the security risk of the application 20 is reduced does not depend on the environment in which the application 20 is realized, and it can be expected that the updated application 21 in which the security risk is reduced is realized instead of the application 20 having the security risk.

The application update process may include adding the meta information entity for each of one or more security services to the setting information 12 including the meta information entity for each of the plurality of microservices 903 in the application 20. Further, the application update process may include updating the meta information entity of the risk microservice 903A (an example of a microservice posing a security risk). The security management DB 113 may include the deployment setting 415 that is information for deploying the security service for each security service. The meta information entity of the security service may include deployment information based on the deployment setting 415 of the security service. This makes it possible to record the relationship between the risk microservice 903A and one or more security services 1601 in the setting information 12 and realize such a relationship in the updated application 21 based on the setting information 12. The meta information entity of the microservice 903 may be a part of the service setting DB entry 1100 (for example, the service setting entry 1103A, the container entry 48A, etc.). Further, the meta information entity of the security service 1601 may be a part of the service setting DB entry 1100 (for example, the service setting entry 1103A, the container entry 48B or 48C, etc.).

The security service 1601 may be the first security service 1601A that checks data. The application update process arranges the first security service 1601A at the preceding stage of the risk microservice 903A to cause the first security service 1601A to check the data to the risk microservice 903A. This may include updating the meta information entity of the risk microservice 903A and adding the meta information entity of the first security service 1601A to the setting information 12. This makes it possible to reduce the security risk by making the first security service 1601A check the data to the risk microservice 903A.

The security service 1601 may be the second security service 1601B that transmits data to the predetermined external system 109 of the application 20. The application update process may include adding the meta information entity of the second security service to the setting information 12 in order to make the second security service 1601B transmit the date representing the check result of the data to the risk microservice 903A toward the external system 109. If the data indicating the check result of the data to the risk microservice 903A is transmitted to the external system 109 and the external system 109 analyzes the data, the reduction of the security risk can be expected.

The security risk reduction system further includes the security analysis unit 112. The security analysis unit 112 may estimate the risk microservice 903A based on the setting information 12 (for example, information indicating the application flow 901) about the application 20 before update, determine the one or more security services 1601, and output the analysis result table 700 which is information including each meta information detail of the one or more security services 1601. The application update process may include adding a meta information entity according to the meta information detail included in the analysis result table 700 to the setting information 12 for each of the one or more security services 1601. Therefore, it can be expected to automate a series of processes such as estimating the microservice 903A as a security risk, determining the security service 1601 that reduces the security risk, and deploying the updated application 21 including the image 17 of the security service 1601.

Here, the following can be said regarding the update of the setting information 12 based on the analysis result table 700.

The setting information 12 may be an example of information including the service setting DB entry 1100. The setting information 12 may include, for example, the service setting DB entry 1100 of each microservice in the updated application 21.

For each security service 1601, an example of the meta information may be all or part of the information included in the record (see FIG. 4) corresponding to the security service 1601.

For each security service 1601, all or part of the information included in the security service entry 713 of the analysis result table 700 may be an example of the meta information details of the security service 1601. For each security service 1601, the meta information details may be generated based on the analysis result by the security analysis unit 112 and the meta information corresponding to the security service 1601.

The security analysis unit 112 may estimate a microservice as the security risk based on the information indicating the application flew 901, the information about the microservice 903 corresponding to the node 93 in the application flow 901 (for example, the information held by the service setting DB entry 1100, the information published on the Web), the cloud partition 1302 on the cloud platform 102 (an example of the calculation resource range), or other information.

For each microservice 903, the meta information entity may be part or all of the information that the service setting DB entry 1100 of the microservice 903 has.

For each security service 1601, the meta information entity may be determined based on the meta information details of the security service 1601 and the meta information of the security service 1601.

Port information can be set for each of the meta information entity of the microservice 903 and the meta information entity of the security service 1601. The microservice 903 and the security service 1601 can be associated by adjusting the value of the port information in the meta information entity of the microservice 903 and the value of the port information in the meta information entity of the security service 1601. For example, the data can be designed to be input to the security service 1601 before the data is input to the microservice 903.

The deployment information included in the meta information entity of the security service 1601 may be information based on the container information (for example, container image, information indicating an installation method of the container, installation parameters used when the container is installed) which is included in the deployment setting 415 of the security service 1601 (see FIG. 4).

Port information or shared volume information can be set in the meta information entity of the security service 1601. By adjusting the value of the port information or the value of the shared volume information of the meta information entity for each of two or more security services 1601, data transmission/reception between the security services 1601 can be performed by the communication with the cloud partition 1302 or the input/output, with respect to the shared volume.

For each of the one or more security services 1601, the application update process may include determining whether to place the security service 1601 in the cloud partition 1302A of the risk microservice 903A based on the type of the security service 1601. As a result, it can be expected that one or more security services 1601 are aggregated in one cloud partition 1302 or distributed to a plurality of cloud partitions 1302 without changing the meta entity information of microservices other than the risk microservice 903A.

At least part of the setting information 12 may be outside the application package. The application update process may include adding to the setting information 12 a meta information entity for each of the one or more security services 1601. The meta information entity of the risk microservice 903A may be updated as appropriate. In this way, the service relationship (the relationship between the risk microservice 903A and one or more security services 1601, and a combination of one or more security services 1601) realized in the updated application 21 can be flexibly configured. For example, the first security service 1601A for checking data can be arranged at the preceding stage of the risk microservice 903A, and the second security service 1601B for transmitting the check result data output, from the first security service 1601A to the external system 109 can be arranged.

Although several embodiments have been described above, these are merely examples for explaining the invention and are not intended to limit the scope of the invention to only these embodiments. Those skilled in the art will recognize that various changes and modifications may be made in form and detail without departing from the spirit and scope of the claimed subject matter.

What is claimed is:

1. A security risk reduction system, comprising:
    a security analysis unit that estimates a security risk of an application by analyzing an application package based on a service setting database;
    an application flow creation unit providing a GUI (Graphical User Interface) that is configured to be displayed on an information processing terminal used by an operator;
        wherein the operator creates a plurality of nodes of an application flow on the GUI,
        wherein the application has a plurality of distributed microservices having a graph structure corresponding to the plurality of nodes,
        wherein the security analysis unit determines a plurality of security services including a security service that reduces the estimated security risk based on a security management database, and
        wherein the security analysis unit acquires a meta information detail of each of the security services based on the security management database, and outputs an analysis result table including the meta information detail acquired for each of the security services; and
    an application update unit that reduces the security risk of the application by performing an application update process for adding the security services to the application based on the security management database and the analysis result table.

2. The security risk reduction system according to claim 1, wherein
    the application update process is a process of updating the application package,
    the application package includes a plurality of microservice images respectively corresponding to the plurality of microservices,
    the application update process includes generating an updated application package by adding one or more security service images respectively corresponding to the one or more security services to the application package, and
    an application including the one or more security services is realized by deploying the updated application package.

3. The security risk reduction system according to claim 2, wherein
    the application update process includes
    adding a meta information entity for each of the one or more security services enabling setting information that includes a meta information entity for each of the plurality of microservices, and
    updating a meta information entity of a risk microservice that is a microservice posing a security risk,
    the security risk reduction system stores security management information that includes deployment setting information that is information for deploying the security service for each security service, and
    the meta information entity of the security service includes deployment information based on the deployment setting information of the security service.

4. The security risk reduction system according to claim 3, wherein
    the one or more security services include a first security service that checks data, and
    the application update process includes updating a meta information entity of the risk microservice and adding a meta information entity of the first security service to the setting information in order to make the first security service check data flowing to the risk microservice by arranging the first security service at a stage preceding the risk microservice in a data flow.

5. The security risk reduction system according to claim 3, wherein
    the one or more security services include a second security service that transmits data to a predetermined external system of the application, and
    the application update process includes adding a meta information entity of the second security service to the setting information in order to make the second security service execute transmitting data representing a check result of data flowing to the risk microservice to the external system.

6. The security risk reduction system according to claim 3, further comprising
    a security analysis unit that estimates risk microservices based on setting information about an application before update, determines the one or more security services for the one or more risk microservices, and outputs analysis result information which is information including respective meta information details of the one or more security services, wherein
    the application update process includes adding, for each of the one or more security services, a meta information entity according to the meta information details included in the analysis result information to the setting information.

7. The security risk reduction system according to claim 3, wherein
    the one or more security services include:
    a first security service to check data, and
    a second security service to transmit data to a predetermined external system of the application, and
    the application update process includes:
    updating the meta information entity of the risk microservice and adding a meta information entity of the first security service to the setting information in order to make the first security service check data flowing to the risk microservice by arranging the first security service at a stage preceding the risk microservice in a data flow and output check result data indicating a result of the check, and
    adding a meta information entity of the second security service to the setting information in order to make the second security service transmit the check result data output from the first security service to the external system.

8. The security risk reduction system according to claim 1, wherein
the application update process includes determining, based on a type of the security service, whether an arrangement destination for each of security services is set within a range of calculation resources used in a risk microservice which is a microservice posing a security risk.

9. The security risk reduction system according to claim 1, wherein
the application update process includes adding a meta information entity for each of the security services enabling setting information that includes a meta information entity for each of the plurality of microservices.

10. A security risk reduction method, comprising:
estimating, by a security analysis unit, a security risk of an application by analyzing an application package based on a service setting database;
providing, by an application flow creation unit, a GUI (Graphical User Interface) that is configured to be displayed on an information processing terminal used by an operator;
wherein the operator creates a plurality of nodes of an application flow on the GUI,
wherein the application has a plurality of distributed microservices having a graph structure corresponding to the plurality of nodes,
wherein the security analysis unit determines a plurality of security services including a security service that reduces the estimated security risk based on a security management database, and
wherein the security analysis unit acquires a meta information detail of each of the security services based on the security management database, and outputs an analysis result table including the meta information detail acquired for each of the security services; and
reducing, by an application update unit, the security risk of the application by performing an application update process for adding the security services to the application based on the security management database and the analysis result table.

11. The security risk reduction method according to claim 10, wherein
the application update process is a process of updating the application package,
the application package includes a plurality of microservice images respectively corresponding to the plurality of microservices,
the application update process includes generating an updated application package by adding one or more security service images respectively corresponding to the one or more security services to the application package, and
an application including the one or more security services is realized by deploying the updated application package.

12. The security risk reduction method according to claim 11, wherein
the application update process includes
adding a meta information entity for each of the one or more security services enabling setting information that includes a meta information entity for each of the plurality of microservices, and
updating a meta information entity of a risk microservice that is a microservice posing a security risk, the method further includes storing security management information that includes deployment setting information that is information for deploying the security service for each security service, and
the meta information entity of the security service includes deployment information based on the deployment setting information of the security service.

13. The security risk reduction method according to claim 12, wherein
the one or more security services include a first security service that checks data, and
the application update process includes updating a meta information entity of the risk microservice and adding a meta information entity of the first security service to the setting information in order to make the first security service check data to the risk microservice by arranging the first security service a: a stage preceding the risk microservice in a data flow.

14. The security risk reduction method according to claim 12, wherein
the one or more security services include a second security service that transmits data to a predetermined external system of the application, and
the application update process includes adding a meta information entity of the second security service to the setting information in order to make the second security service execute transmitting data representing a check result of data flowing to the risk microservice to the external system.

15. The security risk reduction method according to claim 12, further comprising
estimating the risk microservice based on setting information about an application before update, determining the one or more security services, and outputting analysis result information which is information including respective meta information details of the one or more security services, wherein
the application update process includes adding, for each of the one or more security services, a meta information entity according to the meta information details included in the analysis result information to the setting information.

16. The security risk reduction method according to claim 12, wherein
the one or more security services include
a first security service to check data, and
a second security service to transmit data to a predetermined external system of the application, and
the application update process includes
updating the meta information entity of the risk microservice and adding a meta information entity of the first security service to the setting information in order to make the first security service check data flowing to the risk microservice by arranging the first security service at a stage preceding the risk microservice in a data flow and output check result data indicating a result of the check, and
adding a meta information entity of the second security service to the setting information in order to make the second security service transmit the check result data output from the first security service to the external system.

17. The security risk reduction method according to claim 10, wherein
the application update process includes determining, based on a type of the security service, whether an arrangement destination for each of the security services is set within a range of calculation resources used in a risk microservice which is a microservice posing a security risk.

18. The security risk reduction method according to claim 10, wherein the application update process includes adding a meta information entity for each of the security services enabling setting information that includes a meta information entity for each of the plurality of microservices.

* * * * *